United States Patent
Yoshita

(10) Patent No.: US 10,913,629 B2
(45) Date of Patent: Feb. 9, 2021

(54) MEDIUM CONVEYANCE DEVICE

(71) Applicant: PFU LIMITED, Ishikawa (JP)

(72) Inventor: Shogo Yoshita, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 16/444,873

(22) Filed: Jun. 18, 2019

(65) Prior Publication Data
US 2019/0300317 A1  Oct. 3, 2019

Related U.S. Application Data

(63) Continuation of application No. PCT/JP2017/000641, filed on Jan. 11, 2017.

(51) Int. Cl.
*B65H 31/20* (2006.01)
*B65H 29/12* (2006.01)
(Continued)

(52) U.S. Cl.
CPC ............. *B65H 31/20* (2013.01); *B65H 29/12* (2013.01); *B65H 31/00* (2013.01); *B65H 31/26* (2013.01);
(Continued)

(58) Field of Classification Search
CPC ... B65H 1/00; B65H 1/02; B65H 1/04; B65H 31/00; B65H 31/20; B65H 2402/32;
(Continued)

(56) References Cited

U.S. PATENT DOCUMENTS

2005/0254873 A1* 11/2005 Murakami ............. B41J 29/023
  400/55
2016/0122140 A1* 5/2016 Furusawa ................ B65H 1/04
  271/147
(Continued)

FOREIGN PATENT DOCUMENTS

JP    H07-125886 A    5/1995
JP    H11-334961 A    12/1999
(Continued)

OTHER PUBLICATIONS

International Search Report issued in corresponding International Application No. PCT/JP2017/000641, dated Feb. 21, 2017, with English translation.

*Primary Examiner* — Prasad V Gokhale
(74) *Attorney, Agent, or Firm* — McDermott Will & Emery LLP

(57) ABSTRACT

A medium conveyance device includes a first loading base that has a first loading surface formed thereon and is movably supported on a main body, a second loading base that has a second loading surface formed thereon and is movably supported on the first loading base so that the second loading surface is positioned next to with the first loading surface and so that the second loading surface overlaps with the first loading surface, a mechanism that converts motion of the first loading base into motion of the second loading base so that the second loading base is arranged in a position corresponding to a position in which the first loading base is arranged, and an elastic member that is elastically deformed when the second loading base is not arranged in a position corresponding to a position in which the first loading base is arranged.

8 Claims, 14 Drawing Sheets

(51) Int. Cl.
*B65H 31/26* (2006.01)
*H04N 1/00* (2006.01)
*B65H 31/00* (2006.01)

(52) U.S. Cl.
CPC ........... *H04N 1/00* (2013.01); *H04N 1/00519*
(2013.01); *B65H 2301/421* (2013.01); *B65H 2402/32* (2013.01); *B65H 2402/545* (2013.01); *B65H 2403/41* (2013.01); *B65H 2404/144* (2013.01); *B65H 2405/11164* (2013.01); *B65H 2405/3312* (2013.01); *B65H 2511/11* (2013.01)

(58) Field of Classification Search
CPC ............ B65H 2402/33; B65H 2402/54; B65H 2402/545; B65H 2403/41; B65H 2403/53; B65H 2403/723; B65H 2405/11164; B65H 2405/20; B65H 2405/211; B65H 2405/324; B65H 2405/3312; B65H 2511/11; H04N 1/00519
See application file for complete search history.

(56) References Cited

U.S. PATENT DOCUMENTS

| | | | |
|---|---|---|---|
| 2018/0257895 A1* | 9/2018 | Kaneko | B65H 31/20 |
| 2019/0322478 A1* | 10/2019 | Yoshita | H04N 1/00 |

FOREIGN PATENT DOCUMENTS

| | | | |
|---|---|---|---|
| JP | 2003-182889 A | 7/2003 | |
| JP | 2005-154115 A | 6/2005 | |
| JP | 2006-62863 A | 3/2006 | |
| JP | 2016-084233 A | 5/2016 | |

* cited by examiner

MEDIUM CONVEYANCE DEVICE

CROSS-REFERENCE TO RELATED APPLICATION

This application is a continuation of International Application No. PCT/JP2017/000641, filed on Jan. 11, 2017, the entire contents of which are incorporated herein by reference.

FIELD

The embodiments discussed herein are related to a medium conveyance device.

BACKGROUND

A known image reading device is provided with a loading base on which an original document can be loaded. The image reading device is configured so that the loading base is extendable to make it possible to properly load a long original document onto the loading base. By further having the process of extending the loading base automated, the image reading device has an enhanced level of convenience (see Japanese Patent Application Laid-open No. 07-125886).

The image reading device configured in this manner, however, has a problem where a mechanism used for extending the loading base may have a malfunction when a load is imposed on the loading base from an external source while the loading base is in the extended state. Examples of the malfunction include a damage caused by disengagement of teeth of gears provided in the mechanism.

SUMMARY

According to an aspect of an embodiment, a medium conveyance device includes a main body, a first loading base that has a first loading surface formed thereon and is movably supported on the main body so as to be arranged into one selected from between a first position that arranges the first loading surface to face upward and a second position that arranges the first loading surface to face the main body, a second loading base that has a second loading surface formed thereon and is movably supported on the first loading base so as to be arranged into one selected from between a third position that arranges the second loading surface to be positioned next to the first loading surface and a fourth position that arranges the second loading surface to overlap with the first loading surface, a mechanism that converts motion of the first loading base moving from the second position to the first position into motion of the second loading base moving from the fourth position to the third position and converts motion of the first loading base moving from the first position to the second position into motion of the second loading base moving from the third position to the fourth position, and an elastic member that is elastically deformed when the second loading base is not arranged in a position corresponding to a position in which the first loading base is arranged by the mechanism.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Figure 1:
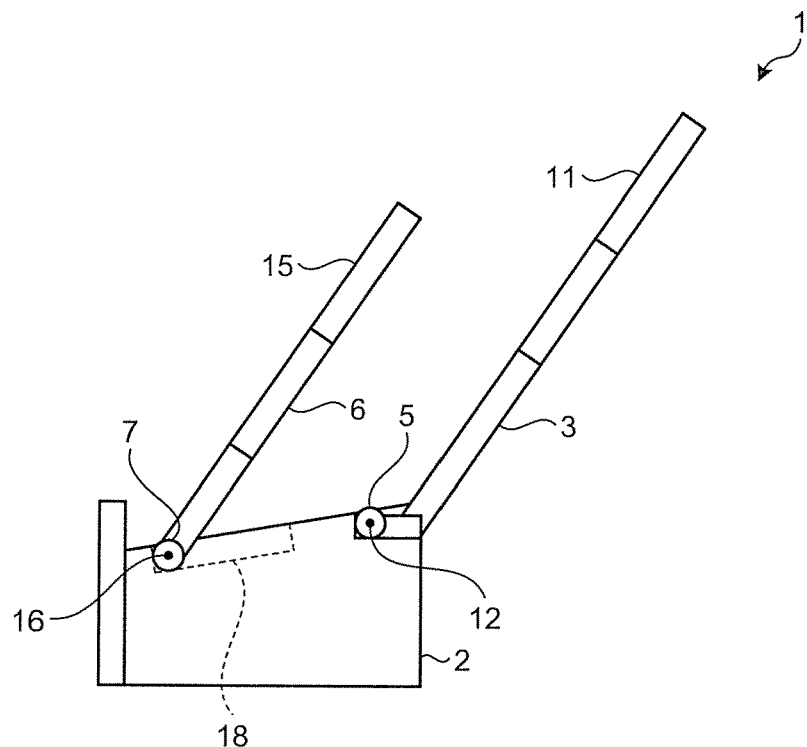
FIG. 1 is a side view illustrating a medium conveyance device according to a first embodiment.

Preferred embodiments of the disclosure will be explained with reference to accompanying drawings. Exemplary embodiments of a medium conveyance device of the present disclosure will be explained below, with reference to the accompanying drawings. Possible embodiments of the present disclosure are not limited to the description below. Further, in the following sections, some of the constituent elements that are the same as one another will be referred to by using the same reference characters, and the duplicate explanations thereof will be omitted.

First Embodiment

FIG. 1 is a side view illustrating a medium conveyance device 1 according to a first embodiment. The medium conveyance device 1 is used as an image reading device. As illustrated in FIG. 1, the medium conveyance device 1 includes a casing 2, a chute 3, a chute supporting unit 5, a stacker 6, and a stacker supporting unit 7. The casing 2 is formed to have a box-like shape and structures a main body of the medium conveyance device 1. The casing 2 is placed on an installation surface on which the medium conveyance device 1 is installed. The chute 3 is formed to have a plate-like shape and has formed thereon a chute loading surface 11 that is substantially flat. The chute 3 is arranged in an upper part at the far back side (on the right side in the page of FIG. 1) of the casing 2 in such a manner that, when the installation surface of the medium conveyance device 1 is level, the chute loading surface 11 faces diagonally upward, while the angle formed by the chute loading surface 11 and the installation surface of the medium conveyance device 1 is equal to 55 degrees. The chute supporting unit 5 supports the chute 3 while allowing the chute 3 to rotate on a rotation axis 12 relative to the casing 2. The rotation axis 12 extends parallel to the installation surface of the medium conveyance device 1 and also extends parallel to the chute loading surface 11. The chute supporting unit 5 also prevents the chute 3 from rotating so that the angle formed by the chute loading surface 11 and the installation surface of the medium conveyance device 1 will not becomes smaller than 55 degrees. In other words, the chute supporting unit 5 supports the chute 3 while preventing the chute 3 from rotating, due to gravity, clockwise on the rotation axis 12 any farther than the state illustrated in FIG. 1.

The stacker 6 is formed to have a plate-like shape and has formed thereon a stacker loading surface 15 that is substantially flat. The stacker 6 is arranged in an upper part on the front side (on the left side in the page of FIG. 1) of the casing 2 in such a manner that the stacker loading surface 15 extends substantially parallel to the chute loading surface 11. In other words, the stacker 6 is arranged in such a manner that the stacker loading surface 15 faces diagonally upward and that the angle formed by the stacker loading surface 15 and the installation surface of the medium conveyance device 1 is equal to 55 degrees. By being arranged in this manner, the stacker 6 covers a part of the chute loading surface 11. The stacker supporting unit 7 supports the stacker 6 while allowing the stacker 6 to rotate on a rotation axis 16 relative to the casing 2. The rotation axis 16 extends parallel to the rotation axis 12, i.e., extends parallel to the installation surface of the medium conveyance device 1 and also extends parallel to the stacker loading surface 15. The stacker supporting unit 7 also prevents the stacker from rotating so that the angle formed by the stacker loading surface 15 and the installation surface of the medium conveyance device 1 will not become larger than 55 degrees. In other words, the stacker supporting unit 7 supports the stacker 6 while preventing the stacker 6 from rotating counterclockwise on the rotation axis 16 any farther than the state illustrated in FIG.

The medium conveyance device 1 has a stacker storage region 18 formed therein. In an upper part of the casing 2, the stacker storage region 18 is formed between the chute 3 and the stacker 6. In other words, the stacker storage region 18 is positioned on the far back side of the rotation axis 16 of the stacker 6 within the upper part of the casing 2 and is positioned on the front side of the rotation axis 12 of the chute 3 within the upper part of the casing 2.

Figure 2:
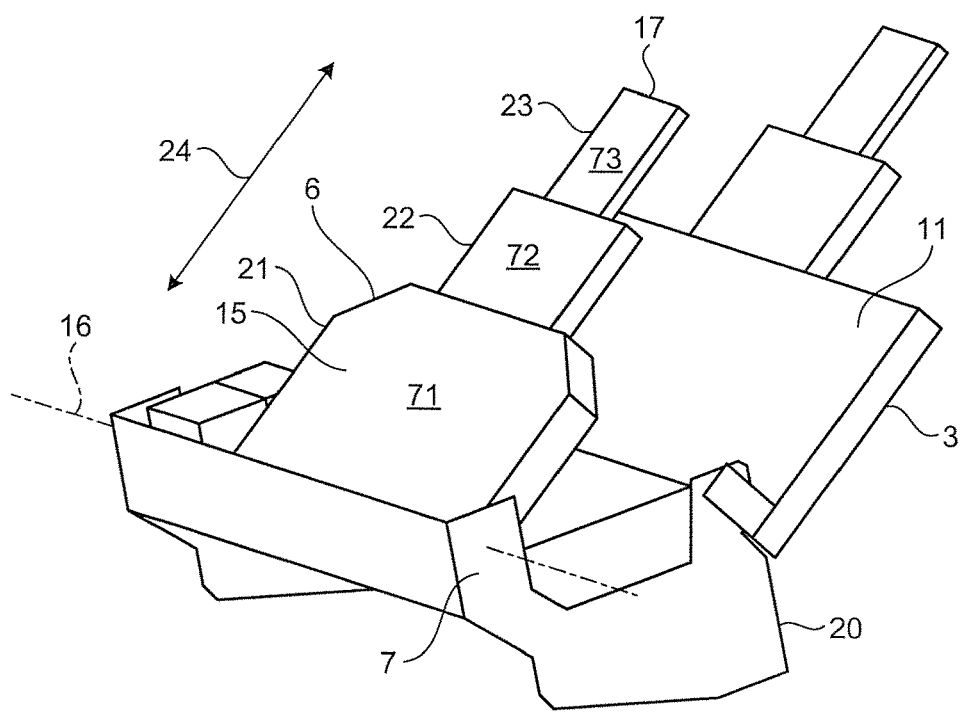
FIG. 2 is a perspective view illustrating a chute and a stacker.

FIG. 2 is a perspective view illustrating the chute 3 and the stacker 6. As illustrated in FIG. 2, the medium conveyance device 1 further includes a frame 20. The frame 20 is fixed to the main body of the medium conveyance device 1. More specifically, the frame 20 is arranged on the inside of the casing 2 and is fixed to the casing 2. The stacker 6 includes a first stacker member 21, a second stacker member 22, and a third stacker member 23. The first stacker member 21 is formed to have a plate-like shape and has formed thereon a first stacker loading surface 71 that forms a part of the stacker loading surface 15. The first stacker member 21 is supported on the frame 20 by the stacker supporting unit 7 so as to be rotatable on the rotation axis 16.

The second stacker member 22 is formed to have a plate-like shape thinner than that of the first stacker member 21. The second stacker member 22 has formed thereon a second stacker loading surface 72 that forms a part of the stacker loading surface 15. The second stacker member 22 is supported on the first stacker member 21, so as to be movable parallel to an extension/retraction direction 24 to be arranged into one selected from between an extended position and a retracted position. The extension/retraction direction 24 is perpendicular to the rotation axis 16 and is parallel to the stacker loading surface 15. The second stacker member 22 is arranged into the extended position as a result of being pulled out from the inside of the first stacker member 21 and is arranged into the retracted position as a result of being pressed into the inside of the first stacker member 21. The second stacker loading surface 72 overlaps with the first stacker loading surface 71 as a result of the second stacker member 22 being arranged into the retracted position. In contrast, the second stacker loading surface 72 is positioned next to the first stacker loading surface 71 as a result of the second stacker member 22 being arranged into the extended position.

The third stacker member 23 is formed to have a plate-like shape thinner than that of the second stacker member 22. The third stacker member 23 has formed thereon a third stacker loading surface 73 that forms a part of the stacker loading surface 15. The third stacker member 23 is supported on the second stacker member 22, so as to be movable parallel to the extension/retraction direction 24 to be arranged into one selected from between an extended position and a retracted position. The third stacker member 23 is arranged into the extended position as a result of being pulled out from the inside of the second stacker member 22 and is arranged into the retracted position as a result of being pressed into the inside of the second stacker member 22. The third stacker loading surface 73 overlaps with the second stacker loading surface 72 as a result of the third stacker member 23 being arranged into the retracted position. In contrast, the third stacker loading surface 73 is positioned next to the second stacker loading surface 72 as a result of the third stacker member 23 being arranged into the extended position. With these arrangements, the stacker 6 is configured to be extendable and retractable, so as to be retracted in such a manner that a stacker end part 17 provided on the far side from the rotation axis 16 becomes closer to the rotation axis 16 and so as to be extended in such a manner that the stacker end part 17 becomes farther away from the rotation axis 16.

The stacker 6 further includes an interlocking mechanism (not illustrated). The interlocking mechanism converts the motion of the second stacker member 22 being pulled out of the first stacker member 21 and being pressed into the first stacker member 21, into motion of the third stacker member 23 being pulled out of the second stacker member 22 and being pressed into the second stacker member 22. In other words, the interlocking mechanism mechanically converts the motion of the second stacker member 22 being pulled out of the first stacker member 21 into the motion of the third stacker member 23 being pulled out of the second stacker member 22. Further, the interlocking mechanism mechanically converts the motion of the second stacker member 22 being pressed into the first stacker member 21 into the motion of the third stacker member 23 being pressed into the second stacker member 22. By having the interlocking mechanism, the stacker 6 is extended and retracted as a result of the second stacker member 22 being pulled out of the first stacker member 21 and being pressed into the first stacker member 21.

Figure 3:
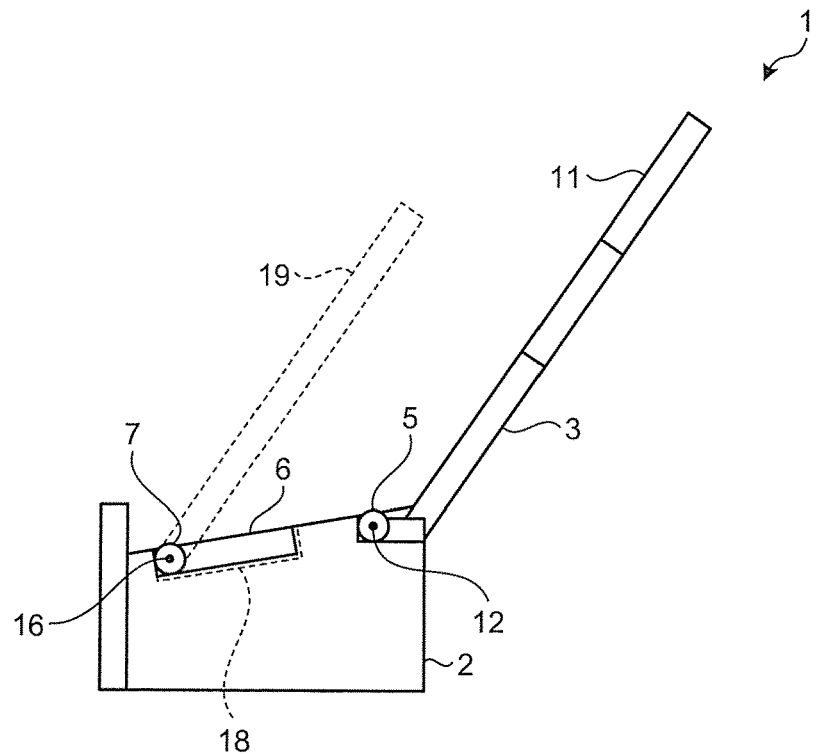
FIG. 3 is a side view illustrating the medium conveyance device while the stacker is in a stored state.

FIG. 3 is a side view illustrating the medium conveyance device 1 while the stacker 6 is stored in the stacker storage region 18. As illustrated in FIG. 3, when having been retracted, the stacker 6 is arranged and stored into the stacker storage region 18 as a result of rotating on the rotation axis 16. In other words, the stacker supporting unit 7 movably supports the stacker 6 so that the stacker 6 is arranged into one selected from between the stacker storage region 18 and a stacker deployment region 19. The stacker deployment region 19 is a region in which the stacker 6 is positioned in FIG. 1. In other words, as a result of the stacker 6 being arranged in the stacker deployment region 19, the stacker loading surface 15 faces diagonally upward so that the angle formed with the installation surface of the medium conveyance device 1 is substantially equal to 55 degrees.

As a result of being arranged in the stacker storage region 18, the stacker 6 exposes the chute loading surface 11, so as to reduce the size of such a region of the chute loading surface 11 that is covered by the stacker 6, compared to the size observed when the stacker 6 is arranged in the stacker deployment region 19. In other words, the size of a shape obtained by orthographically projecting the stacker 6 arranged in the stacker storage region 18 onto the chute loading surface 11 is smaller than the size of a shape obtained by orthographically projecting the stacker 6 arranged in the stacker deployment region 19 onto the chute loading surface 11.

Figure 4:
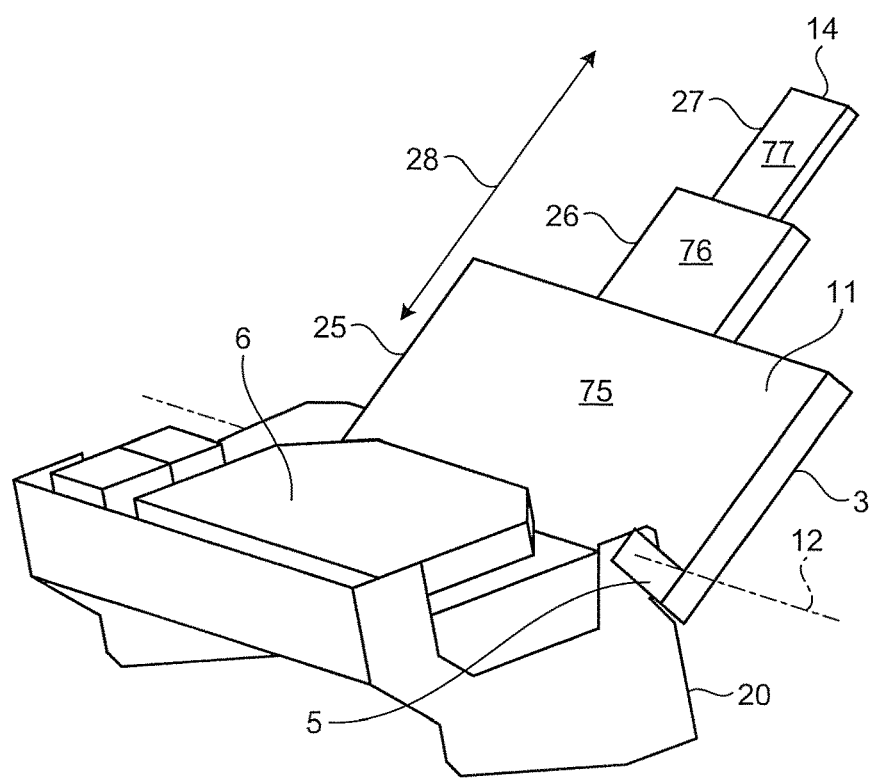
FIG. 4 is a perspective view illustrating the stacker and the chute while the stacker is in the stored state.

FIG. 4 is a perspective view illustrating the stacker 6 and the chute 3 while the stacker 6 is stored in the stacker storage region 18. As illustrated in FIG. 4, the chute 3 includes a first chute member 25, a second chute member 26, and a third chute member 27. The first chute member 25 is formed to have a plate-like shape and has formed thereon a first chute loading surface 75 that forms a part of the chute loading surface 11. The first chute member 25 is supported on the frame 20 by the chute supporting unit 5, so as to be rotatable on the rotation axis 12 to be arranged into one selected from between a deployed position and a stored position. The first chute member 25 is arranged in the deployed position, while the chute loading surface 11 is facing diagonally upward.

The second chute member 26 is formed to have a plate-like shape thinner than that of the first chute member 25 and has formed thereon a second chute loading surface 76 that forms a part of the chute loading surface 11. The second chute member 26 is supported on the first chute member 25, so as to be movable parallel to an extension/retraction direction 28 to be arranged into one selected from between an extended position and a retracted position. The extension/retraction direction 28 is perpendicular to the rotation axis 12 and is parallel to the chute loading surface 11. The second chute member 26 is arranged into the extended position as a result of being pulled out from the inside of the first chute member 25. The second chute member 26 is arranged into the retracted position as a result of being pressed into the inside of the first chute member 25. The second chute loading surface 76 overlaps with the first chute loading surface 75 as a result of being arranged into the retracted position. In contrast, the second chute loading surface 76 is positioned next to the first chute loading surface 75 as a result of being arranged into the extended position.

The third chute member 27 is formed to have a plate-like shape thinner than that of the second chute member 26 and has formed thereon a third chute loading surface 77 that forms a part of the chute loading surface 11. The third chute member 27 is supported on the second chute member 26, so as to be movable parallel to the extension/retraction direction 28 to be arranged into one selected from between an extended position and a retracted position. The third chute member 27 is arranged into the extended position as a result of being pulled out from the inside of the second chute member 26. The third chute member 27 is arranged into the retracted position as a result of being pressed into the inside of the second chute member 26. The third chute loading surface 77 overlaps with the second chute loading surface 76 as a result of being arranged into the retracted position. In contrast, the third chute loading surface 77 is positioned next to the second chute loading surface 76 as a result of being arranged into the extended position. With these arrangements, the chute 3 is configured to be extendable and retractable, so as to be retracted in such a manner that a chute end part 14 provided on the far side from the rotation axis 12 becomes closer to the rotation axis 12 and so as to be extended in such a manner that the chute end part 14 becomes farther away from the rotation axis 12.

Figure 5:
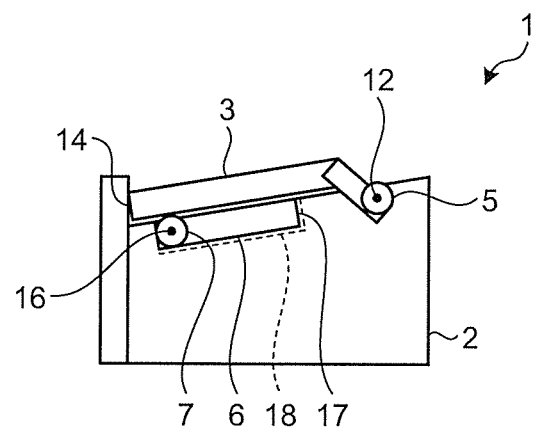
FIG. 5 is a side view illustrating the medium conveyance device while the chute is in a stored state.
Figure 6:
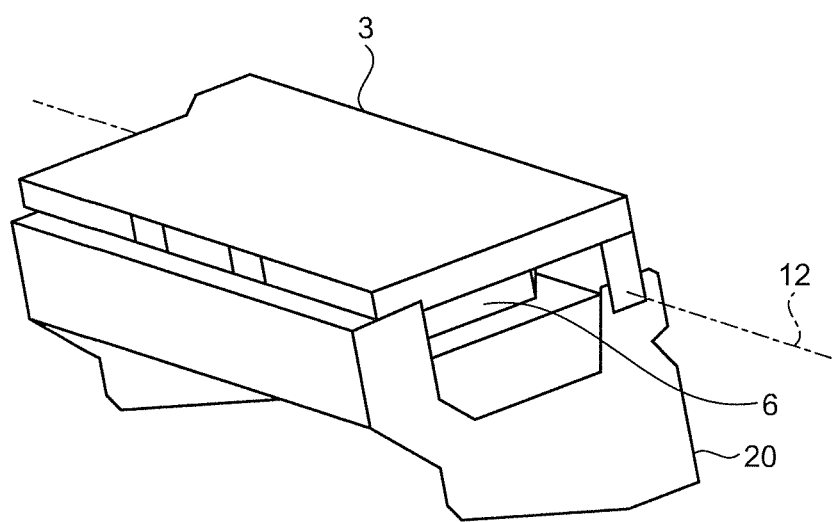
FIG. 6 is a perspective view illustrating the stacker and the chute while the chute is in the stored state.

FIG. 5 is a side view illustrating the medium conveyance device 1 while the chute 3 is in the stored state. FIG. 6 is a perspective view illustrating the stacker 6 and the chute 3 while the chute 3 is in the stored state. As illustrated in FIG. 5, it is possible to have the chute 3 stored over the stacker 6, when the stacker 6 is stored in the stacker storage region 18, while the chute 3 is in the retracted state. In other words, while the chute 3 is in the stored state, the third chute member 27 is arranged in the retracted position and is pressed in the inside of the second chute member 26. Also, while the chute 3 is in the stored state, the second chute member 26 is arranged in the retracted position and is pressed in the inside of the first chute member 25. In addition, while the chute 3 is in the stored state, the first chute member 25 is arranged in the stored position, whereas the first chute loading surface 75 is facing the stacker 6. As a result of the chute 3 being stored, the medium conveyance device 1 becomes less tall and more compact. As a result of being stored, the chute 3 is further able to cover the stacker 6, as illustrated in FIG. 6.

Figure 7:
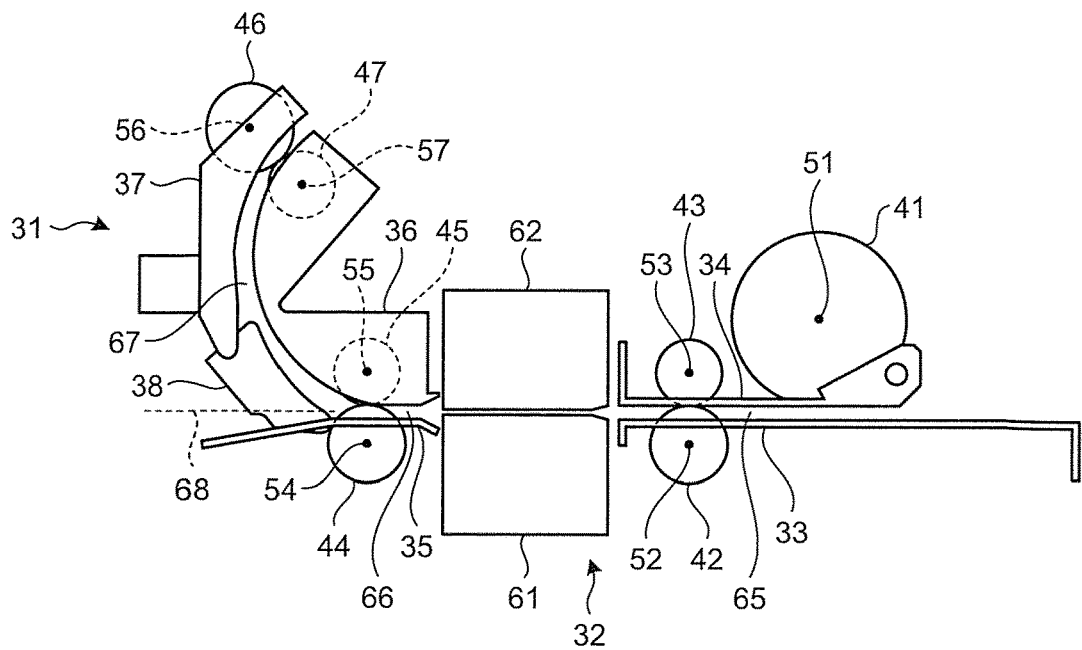
FIG. 7 is a cross-sectional view illustrating a conveyance device and a reading device.

FIG. 7 is a cross-sectional view illustrating a conveyance device 31 and a reading device 32. As illustrated in FIG. 7, the medium conveyance device 1 further includes the conveyance device 31 and the reading device 32.

The Conveyance Device

The conveyance device 31 is arranged on the inside of the casing 2. The conveyance device 31 includes a plurality of conveyance guides 33 to 37, a switching guide 38, and a plurality of conveyance rollers 41 to 47. The conveyance guides 33 to 37 are, namely, a first conveyance guide 33, a second conveyance guide 34, a third conveyance guide 35, a fourth conveyance guide 36, and a fifth conveyance guide 37. The first conveyance guide 33 is formed to have a plate-like shape that is substantially flat. The first conveyance guide 33 is arranged so as to extend along a plane extending substantially parallel to the installation surface of the medium conveyance device 1 and is fixed to the frame 20. The second conveyance guide 34 is formed to have a plate-like shape that is substantially flat. The second conveyance guide 34 is arranged over the first conveyance guide 33 so as to face the first conveyance guide 33. The second conveyance guide 34 is further supported on the frame 20 so as to be able to ascend and descend in the vertical directions.

The third conveyance guide 35 is formed to have a substantially plate-like shape. The third conveyance guide 35 is arranged on the front side of the first conveyance guide 33 so as to extend along a plane extending along the first conveyance guide 33 and is fixed to the frame 20. The fourth conveyance guide 36 is formed to have a cylindrical shape and has formed thereon a convex surface extending along a part of a lateral face of a circular column. The fourth conveyance guide 36 is arranged over the third conveyance guide 35 in such a manner that a part of the convex surface faces the third conveyance guide 35. The fourth conveyance guide 36 is fixed to the frame 20. The fifth conveyance guide 37 is formed to have a cylindrical shape and has formed thereon a concave surface extending along a part of a lateral face of a circular column. The fifth conveyance guide 37 is arranged on the front side of the fourth conveyance guide 36 in such a manner that the concave surface faces a part of the convex surface of the fourth conveyance guide 36.

By having the conveyance guides 33 to 37, the conveyance device 31 has formed therein a conveyance path 65, another conveyance path 66, a U-turn conveyance path 67, and a straight conveyance path 68. The conveyance path 65 is formed between the first conveyance guide 33 and the second conveyance guide 34. The conveyance path 65 is formed so as to extend along a plane extending parallel to the installation surface of the medium conveyance device 1. Further, the conveyance path 65 is formed so as to be connected to the chute loading surface 11 while the chute 3 is in the deployed state. The conveyance path 66 is formed between the third conveyance guide 35 and the fourth conveyance guide 36. The conveyance path 66 is formed so as to extend along a plane extending along the conveyance path 65.

The U-turn conveyance path 67 is formed between the fourth conveyance guide 36 and the fifth conveyance guide 37. The U-turn conveyance path 67 is formed so as to extend along a lateral face of a circular column. The U-turn conveyance path 67 is formed so as to be connected to the stacker loading surface 15, while the stacker 6 is arranged in the stacker deployment region 19. The straight conveyance path 68 is formed underneath the fifth conveyance guide 37.

The straight conveyance path 68 is formed so as to extend along a plane extending along the conveyance path 65. Further, the straight conveyance path 68 is formed so as to be connected to the outside of the casing 2.

The switching guide 38 is formed to have a substantially plate-like shape and is movably supported on the frame 20 so as to be arranged into one selected from between a U-turn path guidance position and a straight path guidance position. The switching guide 38 connects the conveyance path 66 to the U-turn conveyance path 67, as a result of being arranged into the U-turn path guidance position. In contrast, the switching guide 38 connects the conveyance path 66 to the straight conveyance path 68, as a result of being arranged into the straight path guidance position.

The conveyance rollers 41 to 47 are namely a pick roller 41, a first driving roller 42, a first pinch roller 43, a second driving roller 44, a second pinch roller 45, a third driving roller 46, and a third pinch roller 47. The pick roller 41 is formed to have a circular cylindrical shape and is arranged over the conveyance path 65. The pick roller 41 is supported on the frame 20 so as to be rotatable on a rotation axis 51. The rotation axis 51 extends parallel to the rotation axis 12. Further, the pick roller 41 is arranged so as to be in contact with an original document loaded on the chute loading surface 11 of the chute 3 that is in the deployed state. When a plurality of original documents are loaded on the chute loading surface 11, one of the original documents that is in contact with the pick roller 41 is conveyed onto the conveyance path 65, as a result of the pick roller 41 turning in a normal direction thereof (clockwise in FIG. 7) on the rotation axis 51.

The first driving roller 42 is formed to have a circular cylindrical shape and is arranged underneath the conveyance path 65 to be positioned on the front side of the pick roller 41. The first driving roller 42 is supported on the frame 20 so as to be rotatable on a rotation axis 52. The rotation axis 52 extends parallel to the rotation axis 51. The first pinch roller 43 is formed to have a circular cylindrical shape and is arranged over the first driving roller 42. The first pinch roller 43 is supported on the frame 20, so as to be rotatable on a rotation axis 53 so as to be able to ascend and descend in the vertical directions. The rotation axis 53 extends parallel to the rotation axis 52. The first driving roller 42 and the first pinch roller 43 are further arranged in such a manner that the original document conveyed on the conveyance path 65 is interposed between the first driving roller 42 and the first pinch roller 43. The original document conveyed on the conveyance path 65 is conveyed onto the conveyance path 66 as a result of the first driving roller 42 turning in a normal direction thereof (counterclockwise in FIG. 7) on the rotation axis 52 and the original document being pressed and adhered onto the first driving roller 42 by the first pinch roller 43. When the original document conveyed on the conveyance path 65 comes into contact with the second conveyance guide 34, the second conveyance guide 34 ascends or descends relative to the frame 20 so as to be positioned at a height corresponding to the thickness of the original document. In other words, the height of the second conveyance guide 34 is arranged in such a manner that the thicker the original document conveyed on the conveyance path 65 is, the higher the position of the second conveyance guide 34 is. The first pinch roller 43 ascends or descends so as to be positioned at a height corresponding to the thickness of the original document conveyed on the conveyance path 65. In other words, the height of the first pinch roller 43 is arranged in such a manner that the thicker the original document conveyed on the conveyance path 65 is, the higher the position of the first pinch roller 43 is.

The second driving roller 44 is formed to have a circular cylindrical shape and is arranged underneath the conveyance path 66. The second driving roller 44 is supported on the frame 20 so as to be rotatable on a rotation axis 54. The rotation axis 54 extends parallel to the rotation axis 51. The second pinch roller 45 is formed to have a circular cylindrical shape and is arranged over the conveyance path 66. The second pinch roller 45 is supported on the frame 20, so as to be rotatable on a rotation axis 55 so as to be able to ascend and descend in the vertical directions. The rotation axis 55 extends parallel to the rotation axis 54. The second driving roller 44 and the second pinch roller 45 are further arranged in such a manner that the original document conveyed on the conveyance path 66 is interposed between the second driving roller 44 and the second pinch roller 45. The original document conveyed on the conveyance path 66 is conveyed onto one selected from between the U-turn conveyance path 67 and the straight conveyance path 68, as a result of the second driving roller 44 turning in a normal direction thereof (counterclockwise in FIG. 7) on the rotation axis 54 and the original document being pressed and adhered onto the second driving roller 44 by the second pinch roller 45. The second pinch roller 45 ascends or descends so as to be positioned at a height corresponding to the thickness of the original document conveyed on the conveyance path 66. In other words, the height of the second pinch roller 45 is arranged in such a manner that the thicker the original document conveyed on the conveyance path 66 is, the higher the position of the second pinch roller 45 is.

The third driving roller 46 is formed to have a circular cylindrical shape and is arranged on the front side of the U-turn conveyance path 67. The third driving roller 46 is supported on the frame 20 so as to be rotatable on a rotation axis 56. The rotation axis 56 extends parallel to the rotation axis 51. The third pinch roller 47 is formed to have a circular cylindrical shape and is arranged on the far back side of the third driving roller 46. The third pinch roller 47 is supported on the frame 20 so as to be rotatable on a rotation axis 57. The rotation axis 57 extends parallel to the rotation axis 56. The third driving roller 46 and the third pinch roller 47 are further arranged in such a manner that the original document conveyed on the U-turn conveyance path 67 is interposed between the third driving roller 46 and the third pinch roller 47. The original document conveyed on the U-turn conveyance path 67 is loaded onto the stacker loading surface 15 of the stacker 6 positioned in the stacker deployment region 19, as a result of the third driving roller 46 turning in a normal direction thereof (counterclockwise in FIG. 7) and the original document being pressed and adhered onto the third driving roller 46 by the third pinch roller 47.

With these arrangements, the conveyance device 31 conveys the original document placed at the top of the original documents loaded on the chute 3, onto the conveyance paths 65 and 66. The conveyance device 31 further conveys the original document conveyed from the conveyance path 66 to the U-turn conveyance path 67, onto the stacker 6 and further loads the original document onto the stacker loading surface 15. In this situation, the side of the original document facing the chute loading surface 11 while the original document is loaded on the chute 3 is at the back of the side facing the stacker loading surface 15 while the original document is loaded on the stacker loading surface 15 of the stacker 6. The conveyance device 31 further ejects the original document conveyed from the conveyance path 66 to the straight conveyance path 68, to the outside of the casing 2. Further, the U-turn conveyance path 67 is bent to a larger degree than the straight conveyance path 68 is. For this reason, the degree to which an original document passing through the U-turn conveyance path 67 is deformed is larger than the degree to which an original document passing through the straight conveyance path 68 is deformed.

The stacker 6 further includes another interlocking mechanism (not illustrated). When the pick roller 41, the first driving roller 42, the second driving roller 44, and the third driving roller 46 each turn in the normal direction thereof, the interlocking mechanism causes the first stacker member 21 to rotate on the rotation axis 16 and arranges the first stacker member 21 to be positioned in the stacker deployment region 19. While the pick roller 41, the first driving roller 42, the second driving roller 44, and the third driving roller 46 are each turning in the normal direction thereof, the interlocking mechanism holds the first stacker member 21 so that the first stacker member 21 is arranged into the stacker deployment region 19. On the contrary, when the pick roller 41, the first driving roller 42, the second driving roller 44, and the third driving roller 46 each turn in the reverse direction thereof, the interlocking mechanism causes the first stacker member 21 to rotate on the rotation axis 16 and arranges the first stacker member 21 to be positioned in the stacker storage region 18.

The Reading Device

The reading device 32 is positioned between the conveyance path 65 and the conveyance path 66 within the casing 2. The reading device 32 includes a lower image sensor 61 and an upper image sensor 62. The lower image sensor 61 is arranged underneath a plane extending along the conveyance path 65 and the conveyance path 66 and is fixed to the frame 20. The lower image sensor 61 is structured by using an image sensor of a Contact Image Sensor (CIS) type. The lower image sensor 61 comes into contact with a read surface on the bottom side of the original document conveyed from the conveyance path 65 to the conveyance path 66, illuminates the read surface, and reads an image from the read surface by receiving light reflected on the read surface. The upper image sensor 62 is arranged over a plane extending along the conveyance path 65 and the conveyance path 66 and is supported on the frame 20 so as to be movable parallel to the vertical direction. The upper image sensor 62 is structured by using an image sensor of a CIS type. The upper image sensor 62 illuminates a read surface on the top side of the original document conveyed from the conveyance path 65 to the conveyance path 66 and reads an image from the read surface by receiving light reflected on the read surface.

Figure 8:
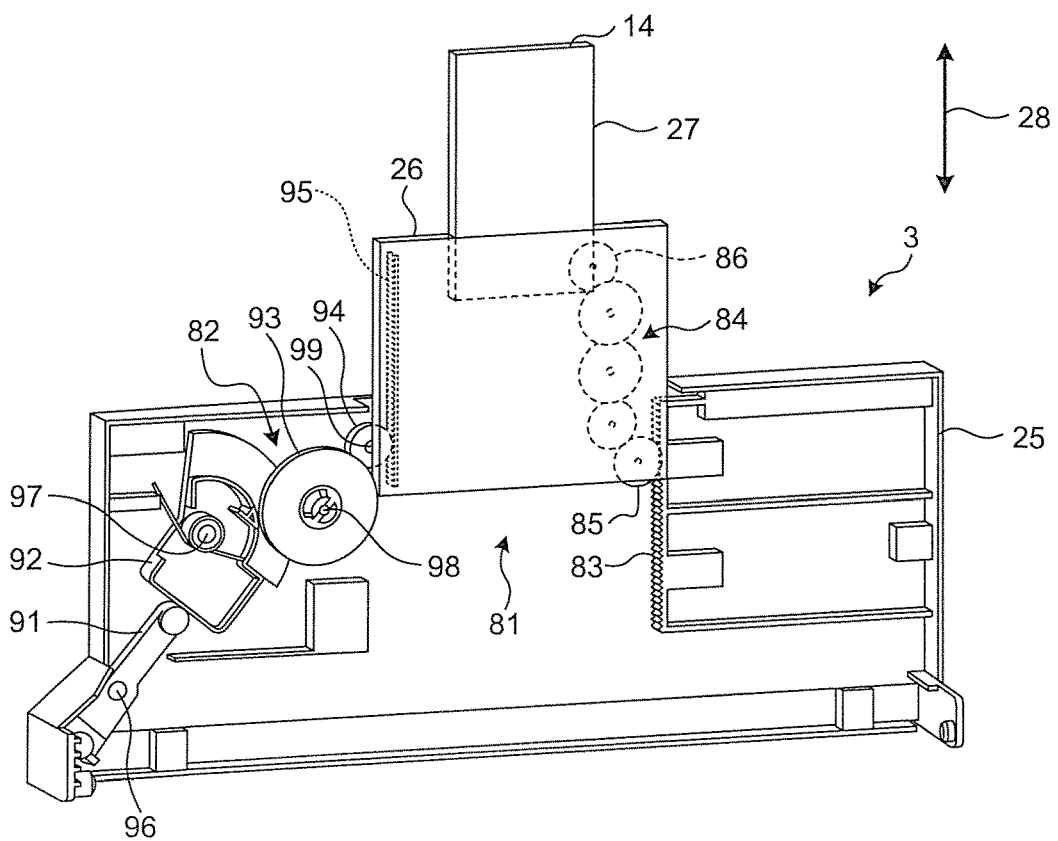
FIG. 8 is a cross-sectional perspective view illustrating a first interlocking mechanism and a second interlocking mechanism.

FIG. 8 is a cross-sectional perspective view illustrating a first interlocking mechanism 81 and a second interlocking mechanism 82. As illustrated in FIG. 8, the chute 3 includes the first interlocking mechanism 81 and the second interlocking mechanism 82. The first interlocking mechanism 81 includes a first rack 83 and a plurality of gears 84 and also includes a second rack (not illustrated). The first rack 83 is arranged to extend along a straight line extending parallel to the extension/retraction direction 28 and is fixed to the first chute member 25. The second rack is arranged along a straight line extending parallel to the extension/retraction direction 28 and is fixed to the third chute member 27.

Each of the gears 84 is formed to have a disc-like shape and has a plurality of teeth formed on the outer circumference thereof. The gears 84 are arranged so as to have the teeth thereof engaged with one another and are rotatably supported on the second chute member 26, while allowing rotational forces thereof to be transmitted to one another.

One of the gears 84, namely a gear 85, engages with the first rack 83. Another one of the gears 84, namely a gear 86, engages with the second rack.

With these arrangements, the first interlocking mechanism 81 mechanically converts the motion of the second chute member 26 being pulled out of the first chute member 25 into the motion of the third chute member 27 being pulled out of the second chute member 26. Further, the first interlocking mechanism 81 mechanically converts the motion of the second chute member 26 being pressed into the first chute member 25 into the motion of the third chute member 27 being pressed into the second chute member 26. Further, the first interlocking mechanism 81 mechanically converts the motion of the third chute member 27 being pulled out of the second chute member 26 into the motion of the second chute member 26 being pulled out of the first chute member 25. Furthermore, the first interlocking mechanism 81 mechanically converts the motion of the third chute member 27 being pressed into the second chute member 26 into the motion of the second chute member 26 being pressed into the first chute member 25.

With these arrangements, the first interlocking mechanism 81 further arranges the third chute member 27 into a position corresponding to the position in which the second chute member 26 is arranged. For example, when the second chute member 26 is arranged in the retracted position, the first interlocking mechanism 81 arranges the third chute member 27 into the retracted position. As another example, when the second chute member 26 is arranged in the extended position, the first interlocking mechanism 81 arranges the third chute member 27 into the extended position. Further, the first interlocking mechanism 81 arranges the second chute member 26 into a position corresponding to the position in which the third chute member 27 is arranged. For example, when the third chute member 27 is arranged in the retracted position, the first interlocking mechanism 81 arranges the second chute member 26 into the retracted position. As another example, when the third chute member 27 is arranged in the extended position, the first interlocking mechanism 81 arranges the second chute member 26 into the extended position.

The second interlocking mechanism 82 includes a lever 91, a fan-shaped gear 92, a deceleration gear 93, a gear 94, and a rack 95. The lever 91 is formed to have a bar-like shape. The lever 91 is supported on the first chute member 25, so as to be rotatable on a rotation axis 96 to be arranged into one selected from between a lever deployed position and a lever stored position. The rotation axis 96 extends perpendicular to the chute loading surface 11. The fan-shaped gear 92 is supported on the first chute member 25, so as to be rotatable on a rotation axis 97 to be arranged into one selected from between a fan-shaped gear deployed position and a fan-shaped gear stored position. The rotation axis 97 extends perpendicular to the chute loading surface 11. The deceleration gear 93 is supported on the first chute member 25 so as to be rotatable on a rotation axis 98. The rotation axis 98 extends perpendicular to the chute loading surface 11. The gear 94 is supported on the first chute member 25 so as to be rotatable on a rotation axis 99. The rotation axis 99 extends perpendicular to the chute loading surface 11. The rack 95 is arranged so as to extend along a straight line extending parallel to the extension/retraction direction 28 and is fixed to the second chute member 26.

Figure 9:
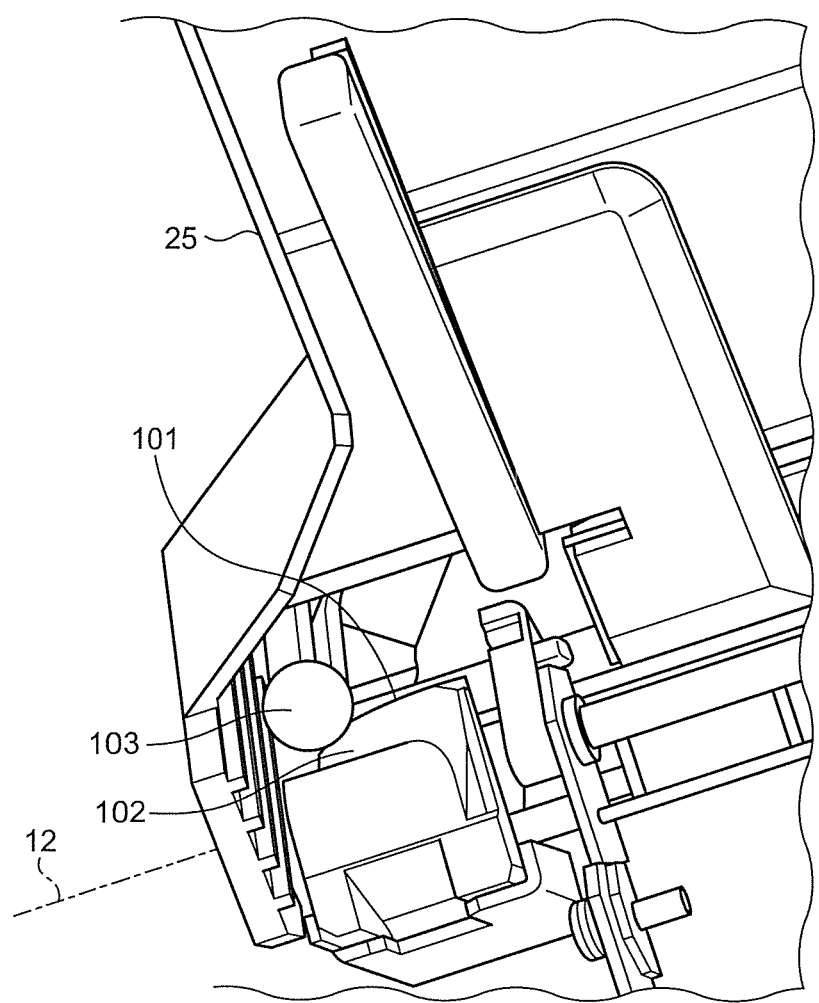
FIG. 9 is a perspective view illustrating a sloped plate.

FIG. 9 is a perspective view illustrating a sloped plate 101. As illustrated in FIG. 9, the second interlocking mechanism 82 further includes the sloped plate 101. The sloped plate 101 is fixed to the frame 20. The sloped plate 101 has a guide surface 102 formed thereon. The guide surface 102 is formed so as to be positioned at an angle with respect to the rotation axis 12. In other words, the guide surface 102 does not extend parallel to the rotation axis 12 and does not extend perpendicular to the rotation axis 12, either. The lever 91 includes a ball part 103. The ball part 103 is arranged on one end of the lever 91 and is fixed to the lever 91.

Figure 10:
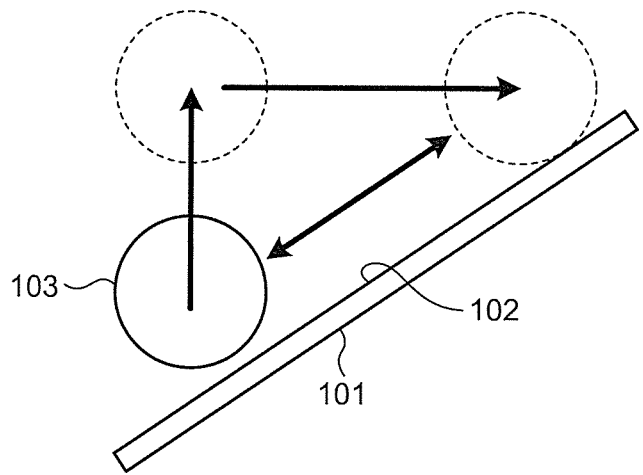
FIG. 10 is a schematic drawing illustrating the sloped plate and a ball part.

FIG. 10 is a schematic drawing illustrating the sloped plate 101 and the ball part 103. As a result of being fixed to the frame 20, the sloped plate 101 moves relative to the first chute member 25 so as to be arranged into one selected from between a sloped plate deployed position and a sloped plate stored position, when the first chute member 25 rotates on the rotation axis 12. In other words, when the first chute member 25 is arranged into the deployed position, the sloped plate 101 is arranged into the sloped plate deployed position. In contrast, when the first chute member 25 is arranged into the stored position, the sloped plate 101 is arranged into the sloped plate stored position. While the sloped plate 101 is moving relative to the first chute member 25, the lever 91 rotates on the rotation axis 96, as a result of the ball part 103 sliding on the guide surface 102 of the sloped plate 101. In this situation, when the sloped plate 101 is arranged into the sloped plate deployed position, the lever 91 is arranged into the lever deployed position.

Figure 11:
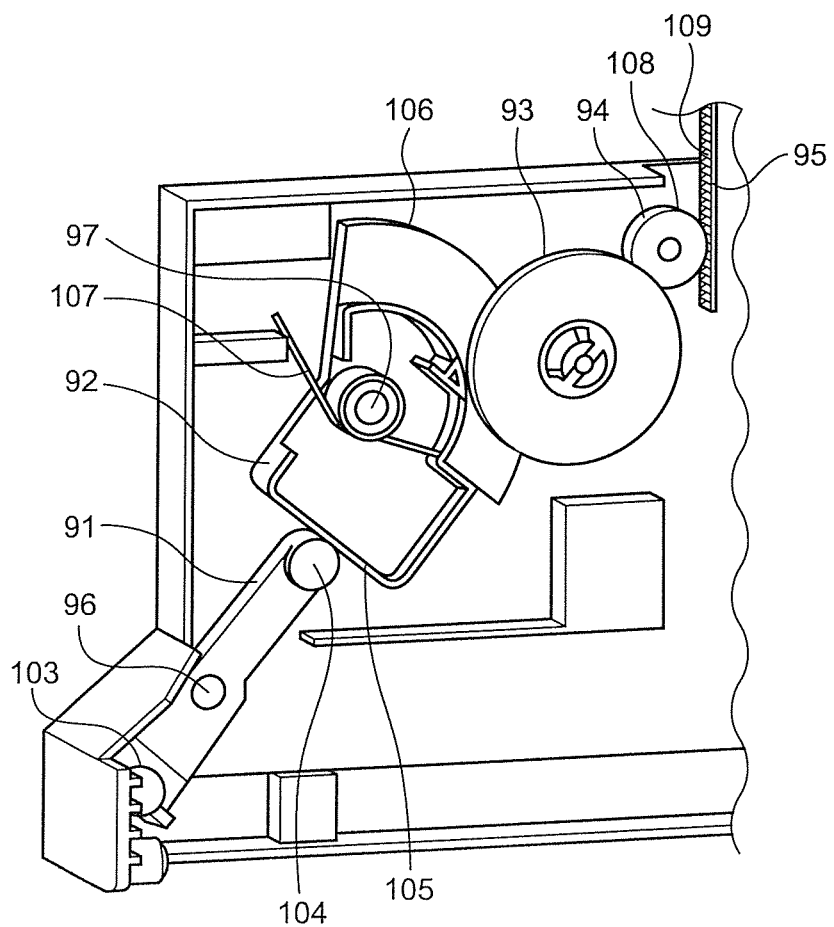
FIG. 11 is a perspective view illustrating the second interlocking mechanism.

FIG. 11 is a perspective view illustrating the second interlocking mechanism 82. The lever 91 is arranged into the lever deployed position as a result of turning clockwise in FIG. 11 on the rotation axis 96, when the sloped plate 101 moves from the sloped plate stored position to the sloped plate deployed position, while the lever 91 is arranged in the lever stored position. The lever 91 includes a sliding section 104. The sliding section 104 is fixed to the other end of the lever 91 that is opposite to the one end at which the ball part 103 is formed.

The fan-shaped gear 92 has formed thereon a sliding surface 105 and a plurality of teeth 106. The sliding surface 105 is formed to be substantially flat. When the lever 91 turns clockwise in FIG. 11 on the rotation axis 96, the fan-shaped gear 92 turns counterclockwise in FIG. 11 as a result of the sliding section 104 of the lever 91 sliding on the sliding surface 105. When the lever 91 moves from the lever stored position to the lever deployed position while the fan-shaped gear 92 is arranged in the fan-shaped gear stored position, the fan-shaped gear 92 is arranged into the fan-shaped gear deployed position as a result of turning counterclockwise in FIG. 11 on the rotation axis 97.

The fan-shaped gear 92 includes a spring 107. The spring 107 is structured by using an elastic member. One end of the spring 107 is fixed to the fan-shaped gear 92, while the other end thereof is fixed to the first chute member 25. The spring 107 applies an elastic force to the fan-shaped gear 92 so that the fan-shaped gear 92 turns clockwise in FIG. 11 on the rotation axis 97. In other words, when the sloped plate 101 is arranged into the sloped plate stored position, the fan-shaped gear 92 is arranged into the fan-shaped gear stored position as a result of an elastic force being applied thereto by the spring 107. When the fan-shaped gear 92 moves from the fan-shaped gear deployed position to the fan-shaped gear stored position while the sloped plate 101 is arranged in the sloped plate stored position, the lever 91 is arranged into the lever stored position as a result of the sliding section 104 sliding on the sliding surface 105.

The gear 94 is formed to have a disc-like shape and has a plurality of teeth 108 formed on the outer circumference thereof. The rack 95 has a plurality of teeth 109 formed on the side thereof facing the gear 94. The teeth 109 engage with the teeth 108. As a result of the teeth 109 engaging with the teeth 108, the gear 94 turns when the second chute member 26 moves relative to the first chute member 25.

Figure 12:
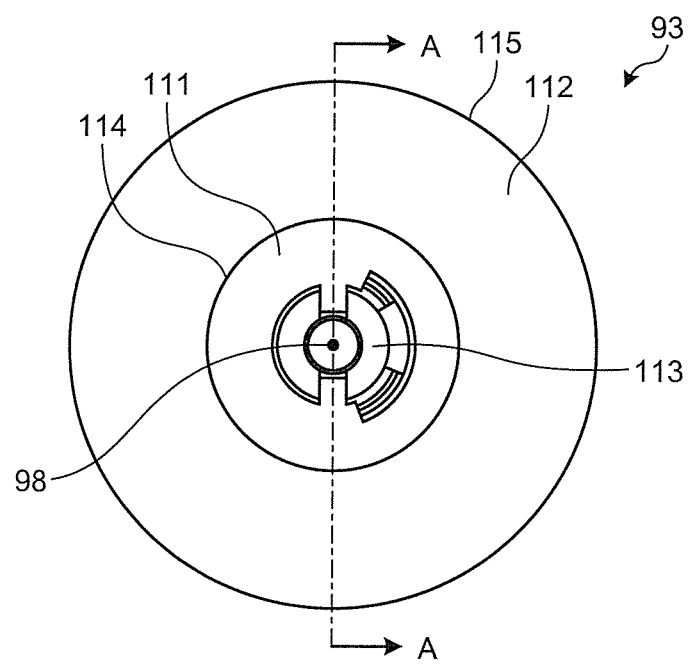
FIG. 12 is a plan view illustrating a deceleration gear.
Figure 13:
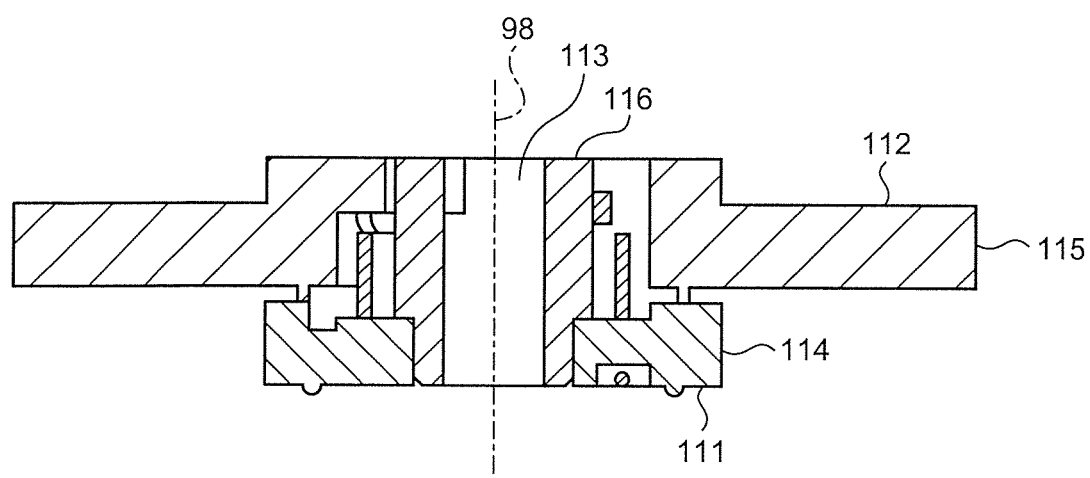
FIG. 13 is a cross-sectional view taken along the line A-A in FIG. 12.
Figure 14:
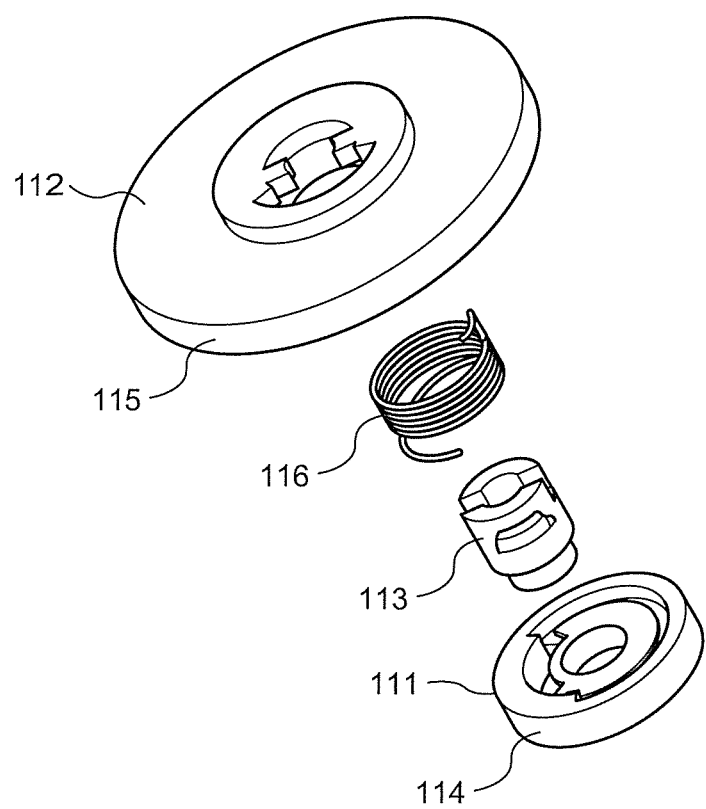
FIG. 14 is an exploded perspective view illustrating the deceleration gear.

FIG. 12 is a plan view illustrating the deceleration gear 93. FIG. 13 is a cross-sectional view taken along the line A-A in FIG. 12. FIG. 14 is an exploded perspective view illustrating the deceleration gear 93. As illustrated in FIG. 12, the deceleration gear 93 includes a small gear 111, a large gear 112, and a core 113. The small gear 111 is formed to have a disc-like shape and has a plurality of teeth 114 formed on the outer circumference thereof. The teeth 114 engage with the teeth 106 formed on the fan-shaped gear 92. The large gear 112 is formed to have a disc-like shape of which the diameter is larger than that of the small gear 111 and has a plurality of teeth 115 formed on the outer circumference thereof. The teeth 115 engage with the teeth 108 formed on the gear 94.

The core 113 is supported on the first chute member 25 and, as illustrated in FIG. 13, supports the small gear 111 in such a manner that the small gear 111 is rotatable on the rotation axis 98 independently of the large gear 112. In other words, the small gear 111 is supported on the first chute member 25 via the core 113, so as to be rotatable on the rotation axis 98 to be arranged into one selected from between a small gear deployed position and a small gear stored position. As a result of the teeth 114 engaging with the teeth 106, the small gear 111 is arranged in the small gear deployed position while the fan-shaped gear 92 is arranged in the fan-shaped gear deployed position, and is arranged in the small gear stored position while the fan-shaped gear 92 is arranged in the fan-shaped gear stored position.

Further, the core 113 supports the large gear 112 in such a manner that the large gear 112 is rotatable on the rotation axis 98 relative to the small gear 111. In other words, the large gear 112 is supported on the first chute member 25 via the core 113, so as to be rotatable on the rotation axis 98 to be arranged into one selected from between a large gear extended position and a large gear retracted position.

As illustrated in FIG. 14, the deceleration gear 93 further includes a spring 116. The spring 116 is structured by using an elastic member and is formed as a torsion coil spring. One end of the spring 116 is fixed to the small gear 111, whereas the other end thereof is fixed to the large gear 112.

Figure 15:
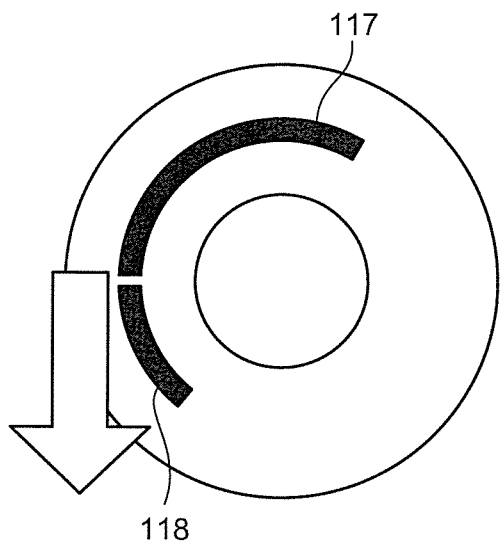
FIG. 15 is a cross-sectional view illustrating a part of a small gear and a part of a large gear.

FIG. 15 is a cross-sectional view illustrating a part of the small gear 111 and a part of the large gear 112. As illustrated in FIG. 15, the small gear 111 has a small gear rib 117 formed thereon. The large gear 112 has a large gear rib 118 formed thereon. When the small gear 111 turns counter-clockwise in FIG. 15, the small gear rib 117 collides with the large gear rib 118 of the large gear 112 and causes the large gear 112 to turn counterclockwise in FIG. 15. On the contrary, when the small gear 111 turns clockwise, the small gear rib 117 moves away from the large gear rib 118 of the large gear 112 so that the turning of the small gear 111 is not transmitted to the large gear 112. The spring 116 is elastically deformed when either the small gear 111 or the large gear 112 turns in such a manner that the small gear rib 117 and the large gear rib 118 become more distant from each other. In contrast, when the small gear rib 117 and the large gear rib 118 are positioned away from each other, the spring 116 applies an elastic force to the small gear 111 and to the large gear 112 so that the small gear rib 117 and the large gear rib 118 become closer to each other.

In other words, the large gear 112 is supported on the small gear 111 via the core 113, so as to be rotatable on the rotation axis 98 to be arranged into one selected from between a no-load position and a load position with respect to the small gear 111. While the large gear 112 is arranged in the no-load position, the small gear rib 117 and the large gear rib 118 are in contact with each other. While the large gear 112 is arranged in the load position, the small gear rib 117 and the large gear rib 118 are positioned away from each other and are not in contact with each other. In other words, while the large gear 112 is arranged in the load position, an elastic force is applied thereto by the spring 116 so that the large gear 112 becomes closer to the no-load position.

The small gear 111 turns clockwise in FIG. 15, when moving from the small gear stored position to the small gear deployed position. On the contrary, the small gear 111 turns counterclockwise in FIG. 15, when moving from the small gear deployed position to the small gear stored position. The large gear 112 turns clockwise in FIG. 15, when moving from the large gear retracted position to the large gear extended position. On the contrary, the large gear 112 turns counterclockwise in FIG. 15 when moving from the large gear extended position to the large gear retracted position. In this situation, when the small gear 111 moves from the small gear deployed position to the small gear stored position, the deceleration gear 93 transmits the turning of the small gear 111 to the large gear 112 in such a manner that the large gear 112 moves from the large gear extended position to the large gear retracted position. In contrast, when the small gear 111 moves from the small gear stored position to the small gear deployed position, the deceleration gear 93 causes the large gear 112 to turn so as to move from the large gear retracted position to the large gear extended position by using the elastic force of the spring 116. Further, when the large gear 112 turns so as to be arranged into the large gear retracted position while the small gear 111 is fixed, the deceleration gear 93 elastically deforms the spring 116 so that the turning of the large gear 112 is not transmitted to the small gear 111. Furthermore, when the small gear 111 moves from the small gear stored position to the small gear deployed position while the large gear 112 is fixed, the deceleration gear 93 elastically deforms the spring 116 so that the turning of the small gear 111 is not transmitted to the large gear 112.

Figure 16:
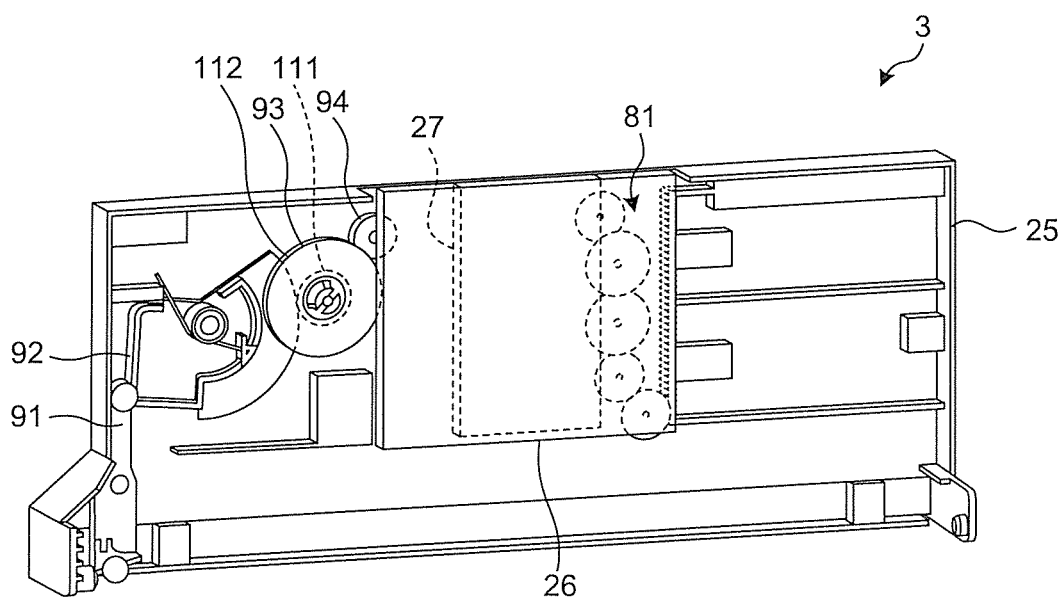
FIG. 16 is a perspective view illustrating the second interlocking mechanism while a first chute member is arranged in a stored position.

FIG. 16 is a perspective view illustrating the second interlocking mechanism 82 while the first chute member 25 is arranged in the stored position. As illustrated in FIG. 16, when the first chute member 25 is arranged in the stored position, the second interlocking mechanism 82 arranges the second chute member 26 into the retracted position. In other words, as a result of the first chute member 25 being arranged into the stored position, the sloped plate 101 is arranged in the sloped plate stored position. As a result of the sloped plate 101 being arranged in the sloped plate stored position, the fan-shaped gear 92 is arranged in the fan-shaped gear stored position by the elastic force of the spring 107. As a result of the fan-shaped gear 92 being arranged in the fan-shaped gear stored position, the lever 91 is arranged in the lever stored position. As a result of the fan-shaped gear 92 being arranged in the fan-shaped gear stored position, the small gear 111 is arranged in the small gear stored position. As a result of the small gear 111 being arranged in the small gear stored position, the large gear 112 is arranged in the large gear retracted position. As a result of the large gear 112 being arranged in the large gear retracted position, the second chute member 26 is arranged in the retracted position.

Figure 17:
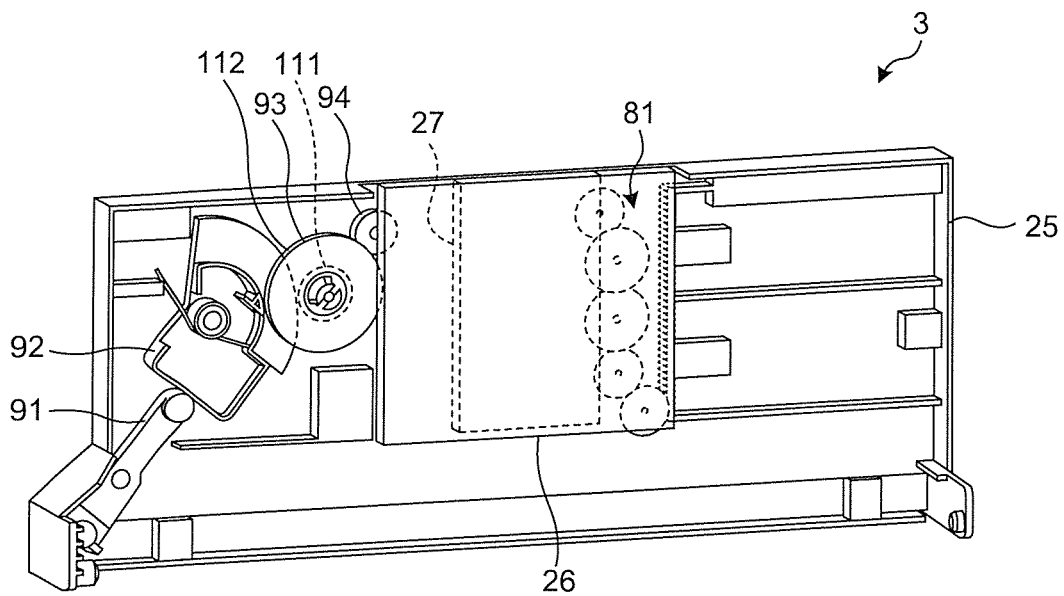
FIG. 17 is a perspective view illustrating the second interlocking mechanism when a third chute member is pressed into the inside of a second chute member, while the first chute member is arranged in a deployed position.

FIG. 17 is a perspective view illustrating the second interlocking mechanism 82 when the third chute member 27 is pressed into the inside of the second chute member 26, while the first chute member 25 is arranged in the deployed position. As a result of the first chute member 25 being arranged into the deployed position, the sloped plate 101 is arranged in the sloped plate deployed position. As a result of the sloped plate 101 being arranged in the sloped plate deployed position, the lever 91 is, as illustrated in FIG. 17, arranged in the lever deployed position. As a result of the lever 91 being arranged into the lever deployed position, the fan-shaped gear 92 is arranged in the fan-shaped gear deployed position. As a result of the fan-shaped gear 92 being arranged into the fan-shaped gear deployed position, the small gear 111 is arranged in the small gear deployed position.

As a result of the second chute member 26 being arranged into the retracted position, the large gear 112 is arranged in the large gear retracted position, which means that the large gear 112 is arranged in the load position with respect to the small gear 111. As a result of the large gear 112 being arranged into the load position, the spring 116 is elastically deformed.

An Operation of the Medium Conveyance Device

When a user wishes to use the medium conveyance device 1 for having an image read from an original document, the user moves the first chute member 25 into the deployed position so that the chute 3 is deployed. When the first chute member 25 is moved to the deployed position, the second interlocking mechanism 82 extends the chute 3. In other words, as a result of the first chute member 25 being moved to the deployed position, the sloped plate 101 moves to the sloped plate deployed position. As result of the sloped plate 101 moving to the sloped plate deployed position, the lever 91 moves to the lever deployed position. As a result of the lever 91 moving to the sloped plate deployed position, the fan-shaped gear 92 moves to the fan-shaped gear deployed position. As a result of the fan-shaped gear 92 moving to the fan-shaped gear deployed position, the small gear 111 moves to the small gear deployed position. As a result of the small gear 111 moving to the small gear deployed position, the large gear 112 moves to the large gear extended position due to the elastic force of the spring 116. As result of the large gear 112 moving to the large gear extended position, the gear 94 and the rack 95 move the second chute member 26 to the extended position and pull out the second chute member 26 from the inside of the first chute member 25. As a result of the second chute member 26 moving to the extended position, the first interlocking mechanism 81 moves the third chute member 27 to the extended position and pulls out the third chute member 27 from the inside of the second chute member 26.

After the chute 3 is deployed and extended, the user loads the original document from which the image is to be read by using the medium conveyance device 1, on the chute loading surface 11. After loading the original document on the chute loading surface 11, the user operates the medium conveyance device 1 so that the image of the original document loaded on the chute 3 is read by the medium conveyance device 1.

When the user operates the medium conveyance device 1, the conveyance device 31 causes the pick roller 41, the first driving roller 42, the second driving roller 44, and the third driving roller 46 to each turn in the normal direction thereof. When the pick roller 41, the first driving roller 42, the second driving roller 44, and the third driving roller 46 each turn in the normal direction thereof, the stacker 6 is deployed and extended. As a result of the pick roller 41 turning in the normal direction thereof, the conveyance device 31 conveys the original documents loaded on the chute loading surface 11 one by one from the chute loading surface 11 to the conveyance path 65.

When coming into contact with an original document, the first pinch roller 43 is rotated by the force of the original document being conveyed and causes the original document to be pressed and adhered onto the first driving roller 42. The original document pressed and adhered onto the first driving roller 42 is conveyed on the conveyance path 65 as a result of the first driving roller 42 turning in the normal direction thereof. The original document that has been conveyed on the conveyance path 65 is supplied to the reading device 32. In that situation, the original document that has been conveyed on the conveyance path 65 is guided to a position between the lower image sensor 61 and the upper image sensor 62 and is subsequently supplied to the conveyance path 66. The original document that has been supplied to the conveyance path 66 is pressed and adhered onto the second driving roller 44 by the second pinch roller 45 and is conveyed on the conveyance path 66 as a result of the second driving roller 44 turning in the normal direction thereof.

The reading device 32 is configured so that, while the original document is being conveyed between the conveyance path 65 and the conveyance path 66, the lower image sensor 61 reads an image from a read surface on the bottom side of the original document by coming into contact with the read surface, whereas the upper image sensor 62 reads an image from a read surface on the top side of the original document by coming into contact with the read surface.

When the thickness of the original document conveyed on the conveyance path 65 is smaller than a predetermined threshold value, the conveyance device 31 arranges the switching guide 38 into the U-turn path guidance position. On the contrary, when the thickness of the original document is larger than the predetermined threshold value, the conveyance device 31 arranges the switching guide 38 into the straight path guidance position. While being arranged in the U-turn path guidance position, the switching guide 38 guides the original document conveyed on the conveyance path 66 to the U-turn conveyance path 67. The original document guided to the U-turn conveyance path 67 is pressed and adhered onto the third driving roller 46 by the third pinch roller 47. As a result of the third driving roller 46 turning in the normal direction thereof, the original document is conveyed on the U-turn conveyance path 67 and is loaded onto the stacker loading surface 15 of the stacker 6. While being arranged in the straight path guidance position, the switching guide 38 guides the original document conveyed on the conveyance path 66 to the straight conveyance path 68. The conveyance device 31 ejects the original document that has been guided to the straight conveyance path 68 to the outside of the casing 2.

When the original documents have been ejected via either the U-turn conveyance path 67 or the straight conveyance path 68, and there is no longer an original document loaded on the chute 3, the conveyance device 31 causes the pick roller 41, the first driving roller 42, the second driving roller 44, and the third driving roller 46 to each turn in the reverse direction thereof. As a result of the pick roller 41, the first driving roller 42, the second driving roller 44, and the third driving roller 46 each turning in the reverse direction thereof, the stacker 6 is retracted and stored into the stacker storage region 18.

An example of the original document having a thickness smaller than the predetermined threshold value is a sheet of paper. Because such an original document is flexible, even when being conveyed on the U-turn conveyance path 67, the original document is not easily curled. Thus, there is a lower possibility that the paper gets jammed on the U-turn conveyance path 67. In contrast, examples of the original document having a thickness larger than the predetermined threshold value include a sheet of cardboard and a plastic card such as a credit card. Such an original document may easily be curled while being conveyed on the U-turn conveyance path 67 or may easily be jammed on the U-turn conveyance path 67. By performing the operation described above, the medium conveyance device 1 arranges such thicker original documents to be ejected via the straight conveyance path 68 without being conveyed on the U-turn conveyance path 67. Accordingly, original documents are not easily curled, and there is a lower possibility that original documents may be jammed on the U-turn conveyance path 67.

When the stacker 6 is stored in the stacker storage region 18, the user is able to arrange the first chute member 25 into the stored position so that the chute 3 is stored. When the first chute member 25 is arranged into the stored position, the second interlocking mechanism 82 retracts the chute 3. In other words, as a result of the first chute member 25 being arranged into the stored position, the sloped plate 101 is arranged into the sloped plate stored position. While the sloped plate 101 is arranged in the sloped plate stored position, the spring 116 moves the fan-shaped gear 92 into the fan-shaped gear stored position, by applying an elastic force to the fan-shaped gear 92. As a result of the sloped plate 101 being arranged in the sloped plate stored position and the fan-shaped gear 92 being arranged in the fan-shaped gear stored position, the lever 91 is arranged into the lever stored position.

As a result of the fan-shaped gear 92 moving to the fan-shaped gear stored position, the small gear 111 moves to the small gear stored position. As a result of the small gear 111 being arranged into the small gear stored position, the large gear 112 is arranged into the large gear retracted position. As a result of the large gear 112 moving to the large gear retracted position, the gear 94 and the rack 95 move the second chute member 26 to the retracted position and press the second chute member 26 into the inside of the first chute member 25. As result of the second chute member 26 moving to the retracted position, the first interlocking mechanism 81 moves the third chute member 27 to the extended position and presses the third chute member 27 into the inside of the second chute member 26.

In other words, when the first chute member 25 is arranged into the stored position, the medium conveyance device 1 arranges, by using the elastic force of the spring 116, the second chute member 26 into the retracted position, arranges the third chute member 27 into the retracted position, and retracts the stacker 6. Because the medium conveyance device 1 retracts the stacker 6 by using the elastic force of the spring 116, even when the second interlocking mechanism 82 has excessive play, it is possible to properly retract the stacker 6 while preventing the second chute member 26 from sticking out from the inside of the first chute member 25.

When deploying the chute 3, there may be some situations where the user rotates the first chute member 25 into the deployed position while pressing the third chute member 27. In that situation, as a result of the third chute member 27 being fixed in the retracted position, the second chute member 26 is fixed in the retracted position via the first interlocking mechanism 81. As a result of the second chute member 26 being fixed in the retracted position, the large gear 112 is fixed in the large gear retracted position via the gear 94 and the rack 95.

As a result of the first chute member 25 being moved to the deployed position, the sloped plate 101 moves to the sloped plate deployed position. As a result of the sloped plate 101 moving to the sloped plate deployed position, the lever 91 moves to the lever deployed position. As a result of the lever 91 moving to the sloped plate deployed position, the fan-shaped gear 92 moves to the fan-shaped gear deployed position. As a result of the fan-shaped gear 92 moving to the fan-shaped gear deployed position, the small gear 111 moves to the small gear deployed position. As a result of the large gear 112 being fixed and the small gear 111 moving to the small gear deployed position, the spring 116 is elastically deformed.

As a result of the spring 116 being elastically deformed in this manner, it is possible to arrange the first chute member 25 into the deployed position while the chute 3 is in the retracted state. In other words, when the chute 3 is used, even when the first chute member 25 is rotated into the deployed position while the third chute member 27 is being pressed, it is possible to prevent the gears included in the first interlocking mechanism 81 and the second interlocking mechanism 82 from having disengagement of teeth, and it is therefore possible to prevent the second interlocking mechanism 82 from being damaged.

While the chute 3 is in the deployed state, there may be some situations where the user presses the second chute member 26 into the first chute member 25 or presses the third chute member 27 into the second chute member 26. In those situations, as a result of the first chute member 25 being arranged in the deployed position, the sloped plate 101 is fixed in the sloped plate deployed position. As a result of the sloped plate 101 being arranged in the sloped plate deployed position, the lever 91 is fixed in the lever deployed position. As a result of the lever 91 arranged in the sloped plate deployed position, the fan-shaped gear 92 is fixed in the fan-shaped gear deployed position. As a result of the fan-shaped gear 92 being arranged in the fan-shaped gear deployed position, the small gear 111 is fixed in the small gear deployed position.

As a result of the third chute member 27 being pressed into the second chute member 26, the first interlocking mechanism 81 moves the second chute member 26 to the retracted position and presses the second chute member 26 into the first chute member 25. As a result of the second chute member 26 being pressed into the first chute member 25, the gear 94 and the rack 95 move the large gear 112 to the retracted position. As a result of the small gear 111 being fixed in the small gear deployed position and the large gear 112 moving to the retracted position, the spring 116 is elastically deformed.

As a result of the spring 116 being elastically deformed in this manner, it is possible to retract the chute 3 while the first chute member 25 is arranged in the deployed position. In other words, even when the chute 3 is retracted while the first chute member 25 is arranged in the deployed position, it is possible to prevent the gears included in the first interlocking mechanism 81 and the second interlocking mechanism 82 from having disengagement of teeth, and it is therefore possible to prevent the second interlocking mechanism 82 from being damaged.

There may be some situations where the user cancels the load pressing the third chute member 27 into the second chute member 26, while the first chute member 25 is arranged in the deployed position. In those situations, as a result of the first chute member 25 being arranged in the deployed position, the second interlocking mechanism 82 is in such a state where the sloped plate 101 is fixed in the sloped plate deployed position, the lever 91 is fixed in the lever deployed position, while the fan-shaped gear 92 is fixed in the fan-shaped gear deployed position, and the small gear 111 is fixed in the small gear deployed position.

While the third chute member 27 is in the state of being pressed in the second chute member 26, the second chute member 26 is fixed in the retracted position via the first interlocking mechanism 81. While the second chute member 26 is fixed in the retracted position, the large gear 112 is fixed in the large gear retracted position via the gear 94 and the rack 95. As a result of the small gear 111 being fixed in the small gear deployed position and the large gear 112 being fixed in the retracted position, the spring 116 is elastically deformed.

As a result of the load pressing the third chute member 27 into the second chute member 26 being cancelled, the second chute member 26 is cancelled from being fixed in the retracted position. As a result of the second chute member 26 being cancelled from being fixed in the retracted position, the large gear 112 is cancelled from being fixed in the large gear retracted position. When the fixation of the large gear 112 is cancelled, the spring 116 applies an elastic force to the large gear 112 as a result of the small gear 111 being fixed in the small gear deployed position, so as to move the large gear 112 to the large gear extended position. As a result of the large gear 112 moving to the large gear extended position, the gear 94 and the rack 95 move the second chute member 26 to the extended position, and also, pull the second chute member 26 from the inside of the first chute member 25. As a result of the second chute member 26 moving to the extended position, the first interlocking mechanism 81 move the third chute member 27 to the extended position, and also, pull the third chute member 27 from the inside of the second chute member 26.

As for the chute 3, as a result of the spring 116 applying the elastic force to the large gear 112 in this manner, it is possible to extend the chute 3 when the load retracting the chute 3 is cancelled while the first chute member 25 is arranged in the deployed position.

Advantageous Effects of the Medium Conveyance Device 1 According to the First Embodiment The medium conveyance device 1 according to the first embodiment includes the main body, the first chute member 25, the second chute member 26, the second interlocking mechanism 82, and the spring 116. The first chute member 25 has the first chute loading surface 75 formed thereon. The first chute member 25 is movably supported on the main body, so as to be arranged into one selected from between: the deployed position which causes the first chute loading surface 75 to face upward; and the stored position which causes the first chute loading surface 75 to face the main body. The second chute member 26 has the second chute loading surface 76 formed thereon. The second chute member 26 is movably supported on the first chute member 25. As a result of moving, the second chute member 26 is arranged into one selected from between: the extended position which causes the second chute loading surface 76 to be positioned next to the first chute loading surface 75; and the retracted position which causes the second chute loading surface 76 to overlap with the first chute loading surface 75. The second interlocking mechanism 82 converts the motion of the first chute member 25 moving from the stored position to the deployed position, into the motion of the second chute member 26 moving from the retracted position to the extended position. Further, the second interlocking mechanism 82 converts the motion of the first chute member 25 moving from the deployed position to the stored position, into the motion of the second chute member 26 moving from the extended position to the retracted position. When the second chute member 26 is not arranged by the second interlocking mechanism 82 in a position corresponding to the position in which the first chute member 25 is arranged, the spring 116 is elastically deformed.

In the medium conveyance device 1 configured in this manner, for example, when the second chute member 26 is arranged into the retracted position while the first chute member 25 is arranged in the deployed position, the spring 116 is elastically deformed. As a result of the spring 116 being elastically deformed, the medium conveyance device 1 is able to prevent the gears included in the second interlocking mechanism 82 from having disengagement of teeth and is thus able to prevent the second interlocking mechanism 82 from being damaged.

Further, the second interlocking mechanism 82 included in the medium conveyance device 1 according to the first embodiment includes the small gear 111, the large gear 112, the gear 94, and the rack 95. When the first chute member 25 is arranged into the deployed position, the small gear 111 is arranged into the small gear deployed position relative to the first chute member 25. In contrast, when the first chute member 25 is arranged into the stored position, the small gear 111 is arranged into the small gear stored position relative to the first chute member 25. The large gear 112 is movably supported on the small gear 111 so as to be arranged into one selected from between the no-load position with respect to the small gear 111 and the load position with respect to the small gear 111. The gear 94 and the rack 95 convert the motion of the small gear 111 moving relative to the first chute member 25, into the motion of the second chute member 26 moving relative to the first chute member 25. Further, the gear 94 and the rack 95 convert the motion of the second chute member 26 moving relative to the first chute member 25, into the motion of the large gear 112 moving relative to the small gear 111. For example, when the small gear 111 is arranged into the small gear deployed position while the large gear 112 is arranged in the no-load position, the gear 94 and the rack 95 arrange the second chute member 26 into the extended position. Further, when the small gear 111 is arranged into the small gear stored position while the large gear 112 is arranged in the no-load position, the gear 94 and the rack 95 arrange the second chute member 26 into the retracted position. In that situation, the spring 116 applies an elastic force to the large gear 112 so that the large gear 112 is arranged into the no-load position.

In the medium conveyance device 1 configured in this manner, when the second chute member 26 is arranged into a position not corresponding to the position in which the first chute member 25 is arranged, the spring 116 is elastically deformed. As a result of the spring 116 being elastically deformed, the medium conveyance device 1 is able to prevent, for example, the gear 94 and the rack 95 from having disengagement of teeth and is thus able to prevent the second interlocking mechanism 82 from being damaged.

The second interlocking mechanism 82 includes the lever 91 and the fan-shaped gear 92. The fan-shaped gear 92 has formed thereon the teeth 106 engaging with the teeth 114 formed on the small gear 111 and is rotatably supported on the first chute member 25. The lever 91 causes the fan-shaped gear 92 to turn in such a manner that the small gear 111 is arranged into the small gear deployed position when the first chute member 25 moves to the deployed position.

The medium conveyance device 1 configured in this manner is able to prevent the fan-shaped gear 92 and the small gear 111 from having disengagement of teeth and is thus able to prevent the second interlocking mechanism 82 from being damaged, as a result of the spring 116 being elastically deformed.

Further, the second interlocking mechanism 82 included in the medium conveyance device 1 according to the first embodiment includes the gear 94 and the rack 95. The gear 94 has formed thereon the teeth engaging with the teeth 115 formed on the large gear 112 and is rotatably supported on the first chute member 25. The rack 95 converts the turning motion of the gear 94, into the motion of the second chute member 26 moving relative to the first chute member 25.

The medium conveyance device 1 is able to prevent the gear 94 and the rack 95 from having disengagement of teeth and is thus able to prevent the second interlocking mechanism 82 from being damaged, as a result of the spring 116 being elastically deformed.

Further, the small gear 111 included in the medium conveyance device 1 according to the first embodiment is supported on the first chute member 25 so as to be rotatable on the rotation axis 98. The large gear 112 is supported on the first chute member 25 so as to be rotatable on the rotation axis 98. In this situation, the spring 116 is structured by using the torsion coil spring of which the one end is fixed to the small gear 111, and of which the other end is fixed to the large gear 112.

The medium conveyance device 1 configured in this manner is able to properly prevent disengagement of gear teeth, because the spring 116 that is elastically deformed when a load is applied to the second chute member 26 is structured by using the torsion coil spring.

Further, the second interlocking mechanism 82 included in the medium conveyance device 1 according to the first embodiment includes the fan-shaped gear 92 and the spring 116. When the first chute member 25 is arranged into the deployed position, the fan-shaped gear 92 arranges the small gear 111 into the small gear deployed position. When the first chute member 25 is arranged into the stored position, the spring 116 applies an elastic force to the fan-shaped gear 92 so that the small gear 111 is arranged into the small gear stored position.

By having the spring 116, the medium conveyance device 1 configured in this manner is able to properly arrange the second chute member 26 into the retracted position while the first chute member 25 is arranged in the stored position.

Further, the medium conveyance device 1 according to the first embodiment further includes the third chute member 27 and the first interlocking mechanism 81. The third chute member 27 has the third chute loading surface 77 formed thereon and is supported on the second chute member 26 so as to be arranged into one selected from between the extended position and the retracted position. When the third chute member 27 is arranged into the extended position, the third chute loading surface 77 is positioned next to the second chute loading surface 76. In contrast, when the third chute member 27 is arranged into the retracted position, the third chute loading surface 77 overlaps with the second chute loading surface 76. The first interlocking mechanism 81 moves the third chute member 27 relative to the second chute member 26, so that the third chute member 27 is arranged into the extended position when the second chute member 26 is arranged into the extended position. Further, the first interlocking mechanism 81 moves the third chute member 27 relative to the second chute member 26, so that the third chute member 27 is arranged into the retracted position when the second chute member 26 is arranged into the retracted position.

Even when including the third chute member 27, the medium conveyance device 1 configured in this manner is able to prevent the gears included in the first interlocking mechanism 81 from having disengagement of teeth and is thus able to prevent the first interlocking mechanism 81 from being damaged, as a result of the spring 116 being elastically deformed.

Incidentally, although the medium conveyance device 1 according to the first embodiment includes the spring 107, it is also acceptable to omit the spring 107.

Second Embodiment

Figure 18:
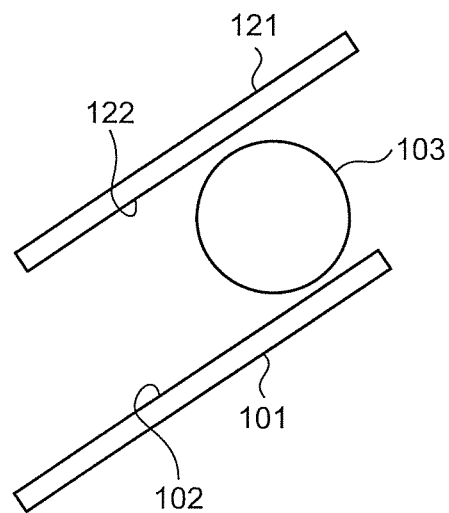
FIG. 18 is a schematic drawing illustrating a sloped plate included a medium conveyance device according to a second embodiment.

A medium conveyance device according to a second embodiment has another sloped plate added to the second interlocking mechanism 82 included in the medium conveyance device 1 according to the first embodiment described above. FIG. 18 is a schematic drawing illustrating a sloped plate 121 included in the medium conveyance device according to the second embodiment. As illustrated in FIG. 18, the sloped plate 121 has a guide surface 122 formed thereon. The sloped plate 121 is arranged in such a manner that the guide surface 122 thereof faces the guide surface 102 of the sloped plate 101. The sloped plate 121 is fixed to the frame 20. In this situation, the ball part 103 of the lever 91 is positioned between the guide surface 122 and the guide surface 102. While the sloped plate 101 is arranged in the sloped plate deployed position, the lever 91 is arranged into the lever deployed position as a result of the ball part 103 sliding on the guide surface 102. While the sloped plate 101 is arranged into the sloped plate stored position, the lever 91 is arranged into the lever stored position as a result of the ball part 103 sliding on the guide surface 122.

Figure 19:
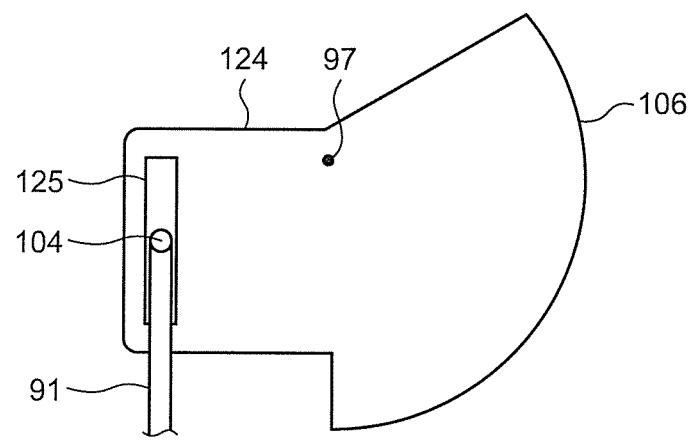
FIG. 19 is a schematic drawing illustrating a fan-shaped gear included in the medium conveyance device according to the second embodiment.

In the medium conveyance device according to the second embodiment, the fan-shaped gear 92 included in the medium conveyance device 1 according to the first embodiment described above is replaced with another fan-shaped gear. FIG. 19 is a schematic drawing illustrating a fan-shaped gear 124 included in the medium conveyance device according to the second embodiment. As illustrated in FIG. 19, the fan-shaped gear 124 has a slide groove 125 formed therein. The sliding section 104 of the lever 91 is fitted in the slide groove 125. As a result of the sliding section 104 being fitted in the slide groove 125, the fan-shaped gear 124 turns in conjunction with the lever 91 when the lever 91 turns, as a result of the sliding section 104 moving along the slide groove 125. In other words, the fan-shaped gear 124 is arranged into a fan-shaped gear stored position when the lever 91 is arranged into the lever stored position. In contrast, the fan-shaped gear 124 is arranged into a fan-shaped gear deployed position when the lever 91 is arranged into the lever deployed position.

By having the spring 116, the medium conveyance device according to the second embodiment is able to prevent the second interlocking mechanism 82 from being damaged, similarly to the medium conveyance device 1 according to the first embodiment described above. Because of being provided with the sloped plate 121, the lever 91 included in the medium conveyance device according to the second embodiment is arranged into the lever stored position without fail when the sloped plate 101 moves to the sloped plate stored position, while the ball part 103 slides on the guide surface 122 of the sloped plate 121. Because the slide groove 125 in which the sliding section 104 is fitted is formed therein, the fan-shaped gear 124 included in the medium conveyance device according to the second embodiment moves to the fan-shaped gear stored position without fail when the lever 91 moves to the lever stored position. For this reason, even without the spring 107, the medium conveyance device according to the second embodiment is able to properly retract the stacker 6, when the first chute member 25 is arranged into the stored position.

Third Embodiment

Figure 20:
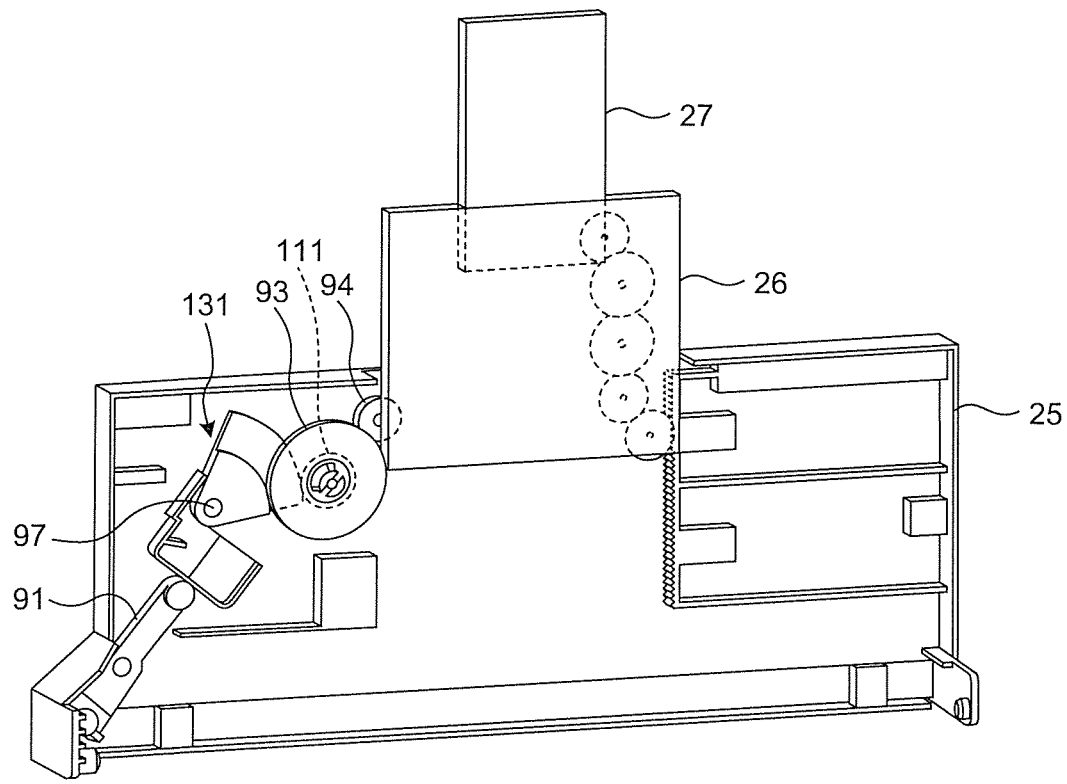
FIG. 20 is a schematic drawing illustrating a second interlocking mechanism included in a medium conveyance device according to a third embodiment.
Figure 21:
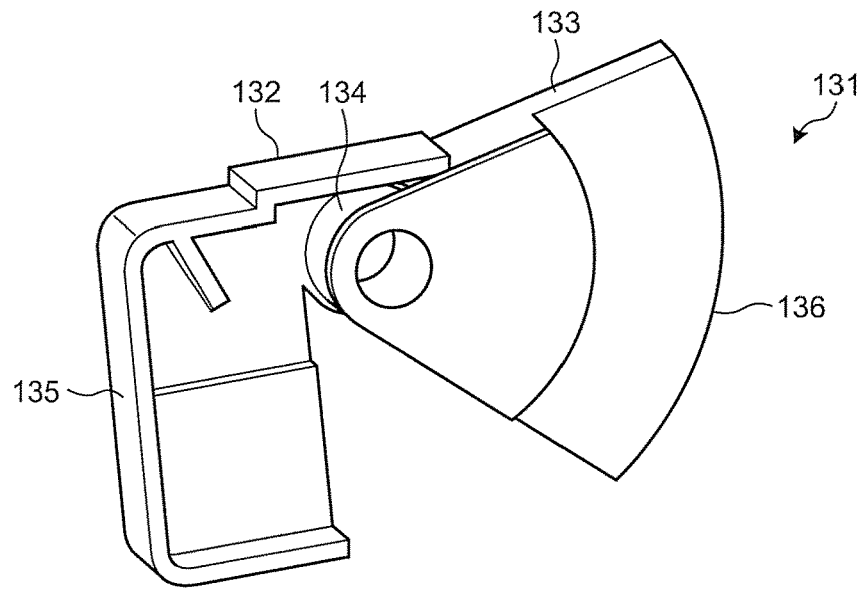
FIG. 21 is a perspective view illustrating a fan-shaped gear included in the medium conveyance device according to the third embodiment.
Figure 22:
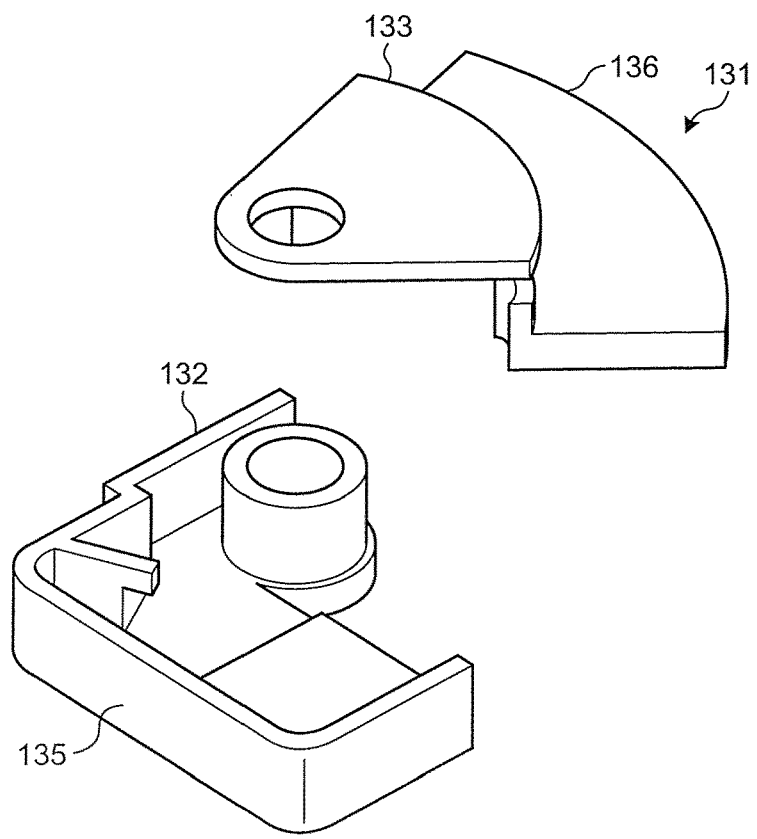
FIG. 22 is an exploded perspective view illustrating the fan-shaped gear included in the medium conveyance device according to the third embodiment.

In a medium conveyance device according to a third embodiment, the large gear 112 of the deceleration gear 93 included in the medium conveyance device 1 according to the first embodiment described above is fixed to the small gear 111 so that the large gear 112 is arranged in the no-load position. FIG. 20 is a schematic drawing illustrating a second interlocking mechanism included in the medium conveyance device according to the third embodiment. In the medium conveyance device according to the third embodiment, the fan-shaped gear 92 included in the medium conveyance device 1 according to the first embodiment described above is further replaced with another fan-shaped gear 131. FIG. 21 is a perspective view illustrating the fan-shaped gear 131 included in the medium conveyance device according to the third embodiment. FIG. 22 is an exploded perspective view illustrating the fan-shaped gear 131 included in the medium conveyance device according to the third embodiment. As illustrated in FIG. 22, the fan-shaped gear 131 includes a sliding part 132, a gear part 133, and a spring 134. The sliding part 132 is supported on the first chute member 25 so as to be rotatable on the rotation axis 97. The sliding part 132 has a sliding surface 135 formed thereon. When the lever 91 rotates clockwise in FIG. 20 on the rotation axis 96, the sliding part 132 rotates counterclockwise in FIG. 20, as a result of the sliding section 104 of the lever 91 sliding on the sliding surface 135. When the lever 91 is arranged into the lever stored position, the sliding part 132 is arranged into a sliding part stored position. In contrast, when the lever 91 is arranged into the lever deployed position, the sliding part 132 is arranged into a sliding part deployed position.

The gear part 133 has a plurality of teeth 136 formed thereon. The gear part 133 is arranged in such a manner that the teeth 136 engage with the teeth 114 of the small gear 111. The gear part 133 is supported on the sliding part 132, so as to be rotatable on the rotation axis 97 to be arranged into one selected from between a no-load position and a load position with respect to the sliding part 132. The spring 134 is structured by using an elastic member and is formed as a torsion coil spring. One end of the spring 134 is fixed to the sliding part 132, whereas the other end thereof is fixed to the gear part 133. The spring 134 is elastically deformed when the gear part 133 is arranged into the load position. The spring 134 applies an elastic force to the gear part 133 so that the gear part 133 moves to the no-load position. In this situation, the large gear 112 is arranged into the large gear retracted position, when the sliding part 132 is arranged into a sliding part stored position while the gear part 133 is arranged in the no-load position. The large gear 112 is arranged into the large gear extended position, when the sliding part 132 is arranged into a sliding part deployed position while the gear part 133 is arranged in the no-load position.

Figure 23:
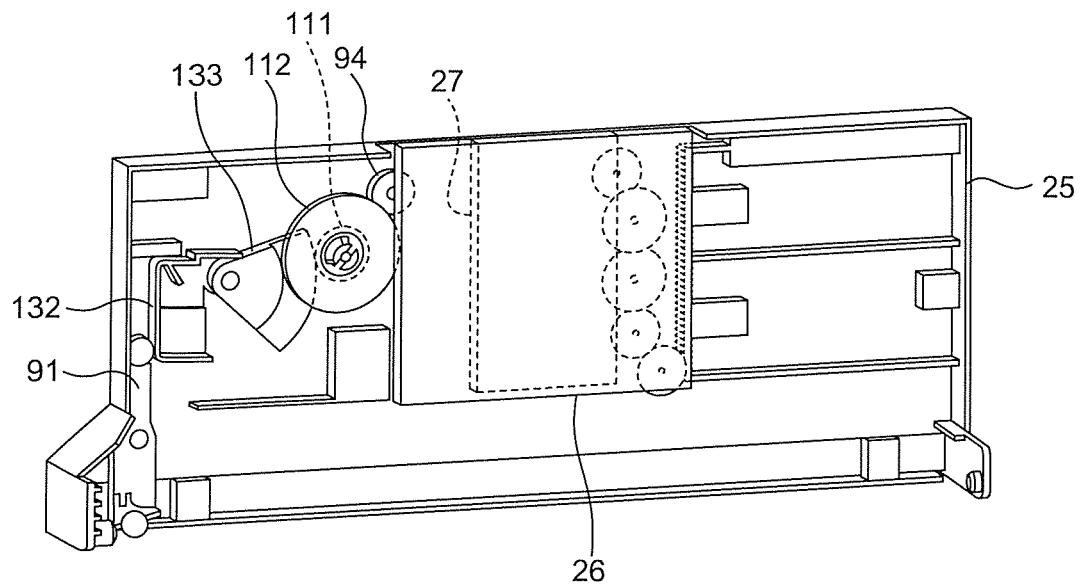
FIG. 23 is a perspective view illustrating a second interlocking mechanism included in the medium conveyance device according to the third embodiment while the first chute member is arranged in the stored position.

FIG. 23 is a perspective view illustrating a second interlocking mechanism included in the medium conveyance device according to the third embodiment while the first chute member 25 is arranged in the stored position. As a result of the first chute member 25 being arranged in the stored position, the sliding part 132 is arranged in the sliding part stored position. The gear part 133 is arranged in the no-load position, and as a result of the sliding part 132 being arranged in the sliding part stored position, the gear part 133 is arranged in a gear part retracted position. As a result of the gear part 133 being arranged in the gear part retracted position, the large gear 112 is arranged in the large gear retracted position. As a result of the large gear 112 being arranged in the large gear retracted position, the second chute member 26 is arranged in the retracted position. As a result of the second chute member 26 being arranged in the retracted position, the third chute member 27 is arranged in the retracted position.

Figure 24:
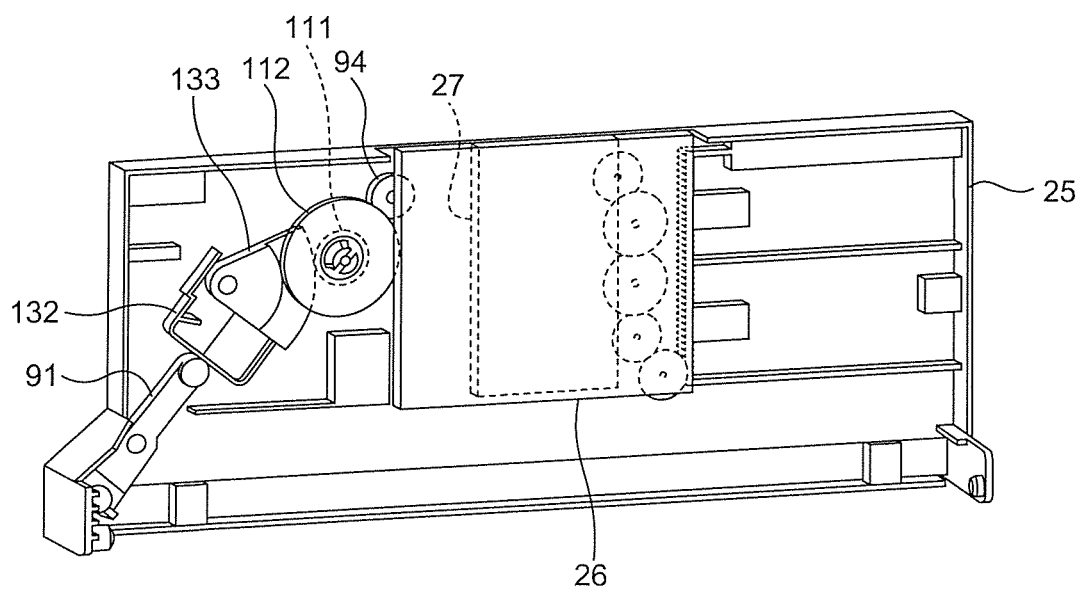
FIG. 24 is a perspective view illustrating the second interlocking mechanism included in the medium conveyance device according to the third embodiment, when the third chute member is pressed into the inside of the second chute member while the first chute member is arranged in the deployed position.

FIG. 24 is a perspective view illustrating the second interlocking mechanism 82 included in the medium conveyance device according to the third embodiment, when the third chute member 27 is pressed into the inside of the second chute member 26 while the first chute member 25 is arranged in the deployed position. As a result of the second chute member 26 being arranged in the retracted position, the large gear 112 is arranged in the large gear retracted position. As a result of the large gear 112 being arranged in the large gear retracted position, the gear part 133 is arranged in the gear part retracted position. As a result of the first chute member 25 being arranged in the deployed position, the sliding part 132 is arranged in the sliding part deployed position. The gear part 133 is arranged in the gear part retracted position and, as a result of the sliding part 132 being arranged in the sliding part deployed position, the gear part 133 is arranged in the load position. As a result of the gear part 133 being arranged into the load position, the spring 134 is elastically deformed and applies an elastic force to the gear part 133 so that the gear part 133 moves to the no-load position.

When the load pressing the third chute member 27 into the inside of the second chute member 26 is cancelled, the gear part 133 moves to the no-load position and is arranged into a gear part extended position, as a result of the elastic force of the spring 134 being applied thereto. As a result of the gear part 133 being arranged into the gear part extended position, the large gear 112 is arranged into the large gear extended position. As a result of the large gear 112 being arranged into the large gear extended position, the second chute member 26 is arranged into the extended position. As a result of the second chute member 26 being arranged into the extended position, the third chute member 27 is arranged into the extended position.

In other words, because the fan-shaped gear 131 is provided with the spring 134, the medium conveyance device according to the third embodiment is able to prevent the second interlocking mechanism from being damaged, similarly to the medium conveyance device 1 according to the first embodiment described above.

Fourth Embodiment

Figure 25:
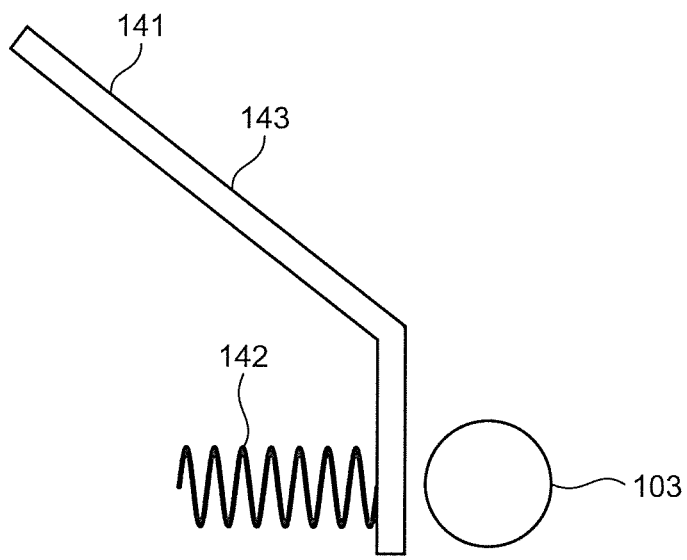
FIG. 25 is a schematic drawing illustrating a sloped plate and a spring included in a medium conveyance device according to a fourth embodiment.

In a medium conveyance device according to a fourth embodiment, the large gear 112 of the deceleration gear 93 included in the medium conveyance device 1 according to the first embodiment described above is fixed to the small gear 111 so that the large gear 112 is arranged in the no-load position. FIG. 25 is a schematic drawing illustrating a sloped plate 141 and a spring 142 included in the medium conveyance device according to the fourth embodiment. In the medium conveyance device according to the fourth embodiment, the sloped plate 101 included in the medium conveyance device 1 according to the first embodiment described above is further replaced with the other sloped plate 141, and also, the spring 142 is additionally provided. As illustrated in FIG. 25, the sloped plate 141 has a guide surface 143 formed thereon. The guide surface 143 is formed so as to be positioned at an angle with respect to the rotation axis 12, similarly to the guide surface 102 of the medium conveyance device 1 according to the first embodiment described above. The sloped plate 141 is supported on the frame 20, so as to be movable parallel to the rotation axis 12 to be arranged into one selected from between a no-load position and a load position with respect to the frame 20. When the sloped plate 141 is arranged into the load position, the spring 142 is elastically deformed and applies an elastic force to the sloped plate 141 so that the sloped plate 141 moves to the no-load position.

In the medium conveyance device according to the fourth embodiment, when the first chute member 25 is arranged into the deployed position, the sloped plate 141 is arranged into a sloped plate deployed position with respect to the first chute member 25, while the sloped plate 141 keeps being arranged in the no-load position with respect to the frame 20. As a result of the sloped plate 141 being arranged into the sloped plate deployed position, the lever 91 is arranged into the lever deployed position, while the ball part 103 slides on the guide surface 143. As a result of the lever 91 being arranged into the lever deployed position, the fan-shaped gear 92 is arranged into the fan-shaped gear deployed position. As a result of the fan-shaped gear 92 being arranged into the fan-shaped gear deployed position, the large gear 112 is arranged into the large gear extended position. As a result of the large gear 112 being arranged into the large gear extended position, the second chute member 26 is arranged into the extended position. As a result of the second chute member 26 being arranged into the extended position, the third chute member 27 is arranged into the extended position.

When the first chute member 25 is arranged into the stored position, the sloped plate 141 is arranged into the sloped plate stored position with respect to the first chute member 25 while the sloped plate 141 keeps being arranged in the no-load position with respect to the frame 20. As a result of the sloped plate 141 being arranged into the sloped plate stored position, the lever 91 is arranged into the lever stored position, while the ball part 103 slides on the guide surface 143. As a result of the lever 91 being arranged into the lever stored position, the fan-shaped gear 92 is arranged into the fan-shaped gear stored position. As a result of the fan-shaped gear 92 being arranged into the fan-shaped gear stored position, the large gear 112 is arranged into the large gear retracted position. As a result of the large gear 112 being arranged into the large gear retracted position, the second chute member 26 is arranged into the retracted position. As a result of the second chute member 26 being arranged into the retracted position, the third chute member 27 is arranged into the retracted position.

In the medium conveyance device according to the fourth embodiment, when a load is applied so as to press the third chute member 27 into the inside of the second chute member 26 while the first chute member 25 is arranged in the deployed position, the third chute member 27 moves to the retracted position. When the third chute member 27 moves to the retracted position, the second chute member 26 moves to the retracted position. When the second chute member 26 moves to the retracted position, the large gear 112 moves to the retracted position. When the large gear 112 is arranged into the large gear retracted position, the fan-shaped gear 92 moves to the fan-shaped gear stored position. When the fan-shaped gear 92 is arranged into the fan-shaped gear stored position, the lever 91 moves to the lever stored position. When the lever 91 is arranged into the lever stored position, the sloped plate 141 moves to the load position. As a result of the sloped plate 141 moving to the load position, the spring 142 is elastically deformed and applies an elastic force to the sloped plate 141 so that the sloped plate 141 moves to the no-load position.

In the medium conveyance device according to the fourth embodiment, when the first chute member 25 is arranged into the deployed position while a load is being applied to press the third chute member 27 into the inside of the second chute member 26, the sloped plate 141 moves to the load position with respect to the frame 20. As a result of the sloped plate 141 moving to the load position with respect to the frame 20, the lever 91 keeps being arranged in the lever stored position.

In the medium conveyance device according to the fourth embodiment, when the load pressing the third chute member 27 into the inside of the second chute member 26 is cancelled, the sloped plate 141 is arranged into the sloped plate deployed position by the elastic force of the spring 142. As a result of the sloped plate 141 being arranged into the sloped plate deployed position, the lever 91 is arranged into the lever deployed position, while the ball part 103 slides on the guide surface 143. As a result of the lever 91 being arranged into the lever deployed position, the fan-shaped gear 92 is arranged into the fan-shaped gear deployed position. As a result of the fan-shaped gear 92 being arranged into the fan-shaped gear deployed position, the large gear 112 is arranged into the large gear extended position. As a result of the large gear 112 being arranged into the large gear extended position, the second chute member 26 is arranged into the extended position. As a result of the second chute member 26 being arranged into the extended position, the third chute member 27 is arranged into the extended position.

In other words, by having the spring 142, the medium conveyance device according to the fourth embodiment is able to prevent the second interlocking mechanism that converts the rotation of the first chute member 25 into the moving of the second chute member 26 from being damaged, similarly to the medium conveyance device according to the first embodiment.

Fifth Embodiment

Figure 26:
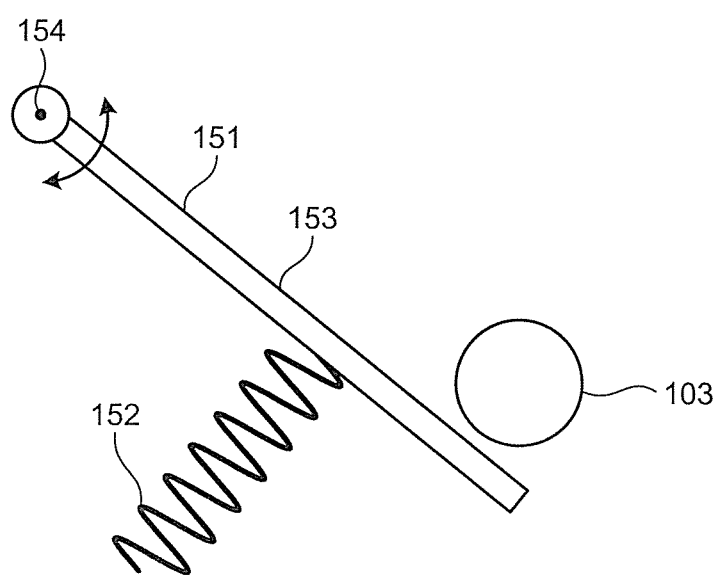
FIG. 26 is a schematic drawing illustrating a sloped plate and a spring included in a medium conveyance device according to a fifth embodiment.

In a medium conveyance device according to a fifth embodiment, the large gear 112 of the deceleration gear 93 included in the medium conveyance device 1 according to the first embodiment described above is fixed to the small gear 111 so that the large gear 112 is arranged in the no-load position. FIG. 26 is a schematic drawing illustrating a sloped plate 151 and a spring 152 included in the medium conveyance device according to the fifth embodiment. In the medium conveyance device according to the fifth embodiment, the sloped plate 101 included in the medium conveyance device 1 according to the first embodiment described above is further replaced with the other sloped plate 151, and also, the spring 152 is additionally provided. As illustrated in FIG. 26, the sloped plate 151 has a guide surface 153 formed thereon. The guide surface 153 is formed so as to be positioned at an angle with respect to the rotation axis 12, similarly to the guide surface 102 included in the medium conveyance device 1 according to the first embodiment described above. The sloped plate 151 is supported on the frame 20, so as to be rotatable on a rotation axis 154 to be arranged into one selected from between a no-load position and a load position with respect to the frame 20. The rotation axis 154 extends orthogonal to the rotation axis 12 of the first chute member 25. When the sloped plate 151 is arranged into the load position, the spring 152 is elastically deformed and applies an elastic force to the sloped plate 151 so that the sloped plate 151 moves to the no-load position.

In the medium conveyance device according to the fifth embodiment, when the first chute member 25 is arranged into the deployed position, the sloped plate 151 is arranged into a sloped plate deployed position relative to the first chute member 25, while the sloped plate 151 keeps being arranged in the no-load position with respect to the frame 20. As a result of the sloped plate 151 being arranged into the sloped plate deployed position, the lever 91 is arranged into the lever deployed position, while the ball part 103 slides on the guide surface 153. As a result of the lever 91 being arranged into the lever deployed position, the fan-shaped gear 92 is arranged into the fan-shaped gear deployed position. As a result of the fan-shaped gear 92 being arranged into the fan-shaped gear deployed position, the large gear 112 is arranged into the large gear extended position. As a result of the large gear 112 being arranged into the large gear extended position, the second chute member 26 is arranged into the extended position. As a result of the second chute member 26 being arranged into the extended position, the third chute member 27 is arranged into the extended position.

When the first chute member 25 is arranged into the stored position, the sloped plate 151 is arranged into a sloped plate stored position relative to the first chute member 25, while the sloped plate 151 keeps being arranged in the no-load position with respect to the frame 20. As a result of the sloped plate 151 being arranged into the sloped plate stored position, the lever 91 is arranged into the lever stored position, while the ball part 103 slides on the guide surface 153. As a result of the lever 91 being arranged into the lever stored position, the fan-shaped gear 92 is arranged into the fan-shaped gear stored position. As a result of the fan-shaped gear 92 being arranged into the fan-shaped gear stored position, the large gear 112 is arranged into the large gear retracted position. As a result of the large gear 112 being arranged into the large gear retracted position, the second chute member 26 is arranged into the retracted position. As a result of the second chute member 26 being arranged into the retracted position, the third chute member 27 is arranged into the retracted position.

In the medium conveyance device according to the fifth embodiment, when a load is applied to press the third chute member 27 into the inside of the second chute member 26 while the first chute member 25 is arranged in the deployed position, the third chute member 27 moves to the retracted position. When the third chute member 27 moves to the retracted position, the second chute member 26 moves to the retracted position. When the second chute member 26 moves to the retracted position, the large gear 112 moves to the retracted position. When the large gear 112 is arranged into the large gear retracted position, the fan-shaped gear 92 moves to the fan-shaped gear stored position. When the fan-shaped gear 92 is arranged into the fan-shaped gear stored position, the lever 91 moves to the lever stored position. When the lever 91 is arranged into the lever stored position, the sloped plate 151 moves to the load position. As a result of the sloped plate 151 moving to the load position, the spring 152 is elastically deformed and applies an elastic force to the sloped plate 151 so that the sloped plate 151 moves to the no-load position.

In the medium conveyance device according to the fifth embodiment, when the first chute member 25 is arranged into the deployed position while a load is being applied to press the third chute member 27 into the inside of the second chute member 26, the sloped plate 151 moves to the load position with respect to the frame 20. As a result of the sloped plate 151 moving to the load position with respect to the frame 20, the lever 91 keeps being arranged in the lever stored position.

In the medium conveyance device according to the fifth embodiment, when the load pressing the third chute member 27 into the inside of the second chute member 26 is cancelled, the sloped plate 151 is arranged into the sloped plate deployed position by an elastic force of the spring 152. As a result of the sloped plate 151 being arranged into the sloped plate deployed position, the lever 91 is arranged into the lever deployed position, while the ball part 103 slides on the guide surface 153. As a result of the lever 91 being arranged into the lever deployed position, the fan-shaped gear 92 is arranged into the fan-shaped gear deployed position. As a result of the fan-shaped gear 92 being arranged into the fan-shaped gear deployed position, the large gear 112 is arranged into the large gear extended position. As a large gear 112 being arranged into the large gear extended position, the second chute member 26 is arranged into the extended position. As a result of the second chute member 26 being arranged into the extended position, the third chute member 27 is arranged into the extended position.

In other words, by having the spring 152, the medium conveyance device according to the fifth embodiment is able to prevent the second interlocking mechanism that converts the rotation of the first chute member 25 into the moving of the second chute member 26 from being damaged, similarly to the medium conveyance device according to the first embodiment.

Incidentally, although the medium conveyance devices described above are each used as an image reading device, it is also acceptable to use any of the medium conveyance devices as another type of device, such as a printer, for example. In that situation, when the medium conveyance device is used as a printer, the reading device 32 is replaced with a printing device. Even when used as a device different from the image reading device, the medium conveyance device is able to prevent the second interlocking mechanism that converts the rotation of the first chute member 25 into the moving of the second chute member 26 from being damaged.

The medium conveyance device according to at least one aspect of the present disclosure is able to prevent the mechanism used for extending the loading base from being damaged.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. A medium conveyance device comprising:
   a main body;

a first loading base that has a first loading surface formed thereon and is movably supported on the main body so as to be arranged into one selected from between a first position that arranges the first loading surface to face upward and a second position that arranges the first loading surface to face the main body;

a second loading base that has a second loading surface formed thereon and is movably supported on the first loading base so as to be arranged into one selected from between a third position that arranges the second loading surface to be positioned next to the first loading surface and a fourth position that arranges the second loading surface to overlap with the first loading surface;

a mechanism that converts motion of the first loading base moving from the second position to the first position into motion of the second loading base moving from the fourth position to the third position and converts motion of the first loading base moving from the first position to the second position into motion of the second loading base moving from the third position to the fourth position; and an elastic member that is elastically deformed when the second loading base is not arranged in a position corresponding to a position in which the first loading base is arranged by the mechanism.

2. The medium conveyance device according to claim 1, wherein the mechanism includes:

a first member that is arranged into a fifth position relative to the first loading base when the first loading base is arranged into the first position and that is arranged into a sixth position relative to the first loading base when the first loading base is arranged into the second position;

a second member that is movably supported on the first member so as to be arranged into one selected from between a seventh position relative to the first member and an eighth position relative to the first member; and another mechanism that converts motion of the first member moving relative to the first loading base into motion of the second loading base moving relative to the first loading base and that converts motion of the second loading base moving relative to the first loading base into motion of the second member moving relative to the first member, in such a manner that the second loading base is arranged into the third position when the first member is arranged into the fifth position while the second member is arranged in the seventh position and that the second loading base is arranged into the fourth position when the first member is arranged into the sixth position while the second member is arranged in the seventh position, and the elastic member applies an elastic force to the second member so that the second member is arranged into the seventh position while the second member is arranged in the eighth position.

3. The medium conveyance device according to claim 2, wherein the mechanism further includes:

a gear that has formed thereon a plurality of teeth engaging with a plurality of teeth formed on the first member and that is rotatably supported on the first loading base; and yet another mechanism that turns the gear in such a manner that the first member is arranged into the fifth position as a result of the first loading base moving to the first position.

4. The medium conveyance device according to claim 3, wherein said yet another mechanism further turns the gear in such a manner that the first member is arranged into the sixth position as a result of the first loading base moving to the second position.

5. The medium conveyance device according to claim 2, wherein the mechanism includes:

a gear that has formed thereon a plurality of teeth engaging with a plurality of teeth formed on the second member and that is rotatably supported on the first loading base; and yet another mechanism that converts turning motion of the gear into motion of the second loading base moving relative to the first loading base.

6. The medium conveyance device according to claim 2, wherein the first member is supported on the first loading base so as to be rotatable on a rotation axis, the second member is supported on the first loading base so as to be rotatable on the rotation axis, and the elastic member is structured by using a torsion coil spring of which one end is fixed to the first member and of which other end is fixed to the second member.

7. The medium conveyance device according to claim 2, wherein the mechanism further includes:

a third member that arranges the first member into the fifth position when the first loading base is arranged into the first position; and another elastic member that applies an elastic force to the third member so as to arrange the first member into the sixth position when the first loading base is arranged into the second position.

8. The medium conveyance device according to claim 1, further comprising:

a third loading base that has formed a third loading surface thereon and is supported on the second loading base so as to be arranged into one selected from between a ninth position that arranges the third loading surface to be positioned next to the second loading surface and a tenth position that arranges the third loading surface to overlap with the second loading surface; and a interlocking mechanism that moves the third loading base relative to the second loading base in such a manner that the third loading base is arranged into the ninth position when the second loading base is arranged into the third position and that the third loading base is arranged into the tenth position when the second loading base is arranged into the fourth position.

* * * * *